(12) United States Patent
Kaneko et al.

(10) Patent No.: US 11,175,559 B2
(45) Date of Patent: Nov. 16, 2021

(54) ELECTROCHROMIC DEVICE

(71) Applicant: Ricoh Company, Ltd., Tokyo (JP)

(72) Inventors: Fuminari Kaneko, Kanagawa (JP); Yuto Matsuoka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 370 days.

(21) Appl. No.: 16/374,113

(22) Filed: Apr. 3, 2019

(65) Prior Publication Data

US 2019/0310530 A1 Oct. 10, 2019

(30) Foreign Application Priority Data

Apr. 5, 2018 (JP) .............................. JP2018-073253
Mar. 26, 2019 (JP) .............................. JP2019-057861

(51) Int. Cl.
*G02F 1/1516* (2019.01)
*C09K 9/02* (2006.01)

(52) U.S. Cl.
CPC ............ *G02F 1/15165* (2019.01); *C09K 9/02* (2013.01); *C09K 2211/145* (2013.01);
(Continued)

(58) Field of Classification Search
CPC ........ G02F 1/155; G02F 1/1533; G02F 1/157; G02F 1/153; G02F 1/161; G02F 1/163; G02F 1/15165; G02F 1/1524; G02F 2001/1555; G02F 1/1503; G02F 2001/164; G02F 2001/1536; G02F 2001/15145; G02F 2202/36; G02F 1/1506; G02F 1/1516; G02F 1/1525; G02F 1/1508; G02F 2001/1502; G02F 1/0018; G02F 1/15; G02F 1/1523; G02F 2001/1552; G02F 2201/122; G02F 2201/44; G02F 2201/50; G02F 2202/00; G02F 2202/02; G02F 2202/023; G02F 1/133305; G02F 1/133351; G02F 1/13338; G02F 1/1339; G02F 1/13439;
(Continued)

(56) References Cited

U.S. PATENT DOCUMENTS

2007/0008603 A1* 1/2007 Sotzing .................... C09K 9/02
359/265
2016/0209721 A1 7/2016 Matsumoto et al.
(Continued)

FOREIGN PATENT DOCUMENTS

JP 11-183940 7/1999
JP 2016-045464 4/2016

*Primary Examiner* — Collin X Beatty
*Assistant Examiner* — Grant A Gagnon
(74) *Attorney, Agent, or Firm* — Xsensus LLP

(57) ABSTRACT

An electrochromic device is provided. The electrochromic device includes a first electrode, a second electrode opposed to the first electrode at an interval, and an electrochromic layer between the first electrode and the second electrode. The electrochromic layer contains an electrochromic material and a first ion-conducting material partially comprising a non-ion-conducting portion that does not conduct ions. The non-ion-conducting portion comprises a molecular unit structure having an atomic arrangement in which 8 or more atoms having a valence of 2 or more are bonded with each other. The atoms comprise heteroatoms in a number of 15% or less based on a total number of the atoms.

11 Claims, 1 Drawing Sheet

(52) U.S. Cl.
CPC .............. *C09K 2211/1425* (2013.01); *C09K 2211/1433* (2013.01); *G02F 2202/022* (2013.01)

(58) Field of Classification Search
CPC .............. G02F 1/1345; G02F 1/15245; G02F 2202/38; G02F 2203/02; G02F 2203/10; G02F 2203/34; G02F 2203/62; G02F 1/0105; G02F 1/0107; G02F 1/0128; G02F 1/03; G02F 1/13; G02F 1/13324; G02F 1/133357; G02F 1/133374; G02F 1/1334; G02F 1/133512; G02F 1/133514; G02F 1/133516; G02F 1/133553; G02F 1/133611; G02F 1/134309; G02F 1/134318; G02F 1/134345; G02F 1/1347; G02F 1/13718; G02F 1/1521; G02F 1/167; G02F 1/1679; G02F 1/172; G02F 1/19; G02F 2001/1512; G02F 2001/1515; G02F 2001/1517; G02F 2001/1557; G02F 2201/02; G02F 2201/123; G02F 2201/14; G02F 2201/34; G02F 2202/16; G02F 2202/28; G02F 2203/01; G02F 2203/09; G02F 2203/11; C09K 9/02; C09K 9/00; C09K 2211/1092; C09K 11/06; C09K 2211/1007; C09K 2211/1029; C09K 2211/1051; C09K 2211/1433; C09K 2211/1491

USPC ........................................................ 359/265
See application file for complete search history.

(56) References Cited

U.S. PATENT DOCUMENTS

| | | |
|---|---|---|
| 2017/0010514 A1 | 1/2017 | Yashiro et al. |
| 2017/0168366 A1 | 6/2017 | Shinoda et al. |
| 2017/0235203 A1 | 8/2017 | Yamamoto et al. |
| 2017/0329197 A1 | 11/2017 | Yashiro et al. |
| 2017/0329198 A1 | 11/2017 | Matsuoka et al. |
| 2018/0044581 A1 | 2/2018 | Sagisaka et al. |
| 2018/0113366 A1 | 4/2018 | Kaneko et al. |
| 2018/0173070 A1 | 6/2018 | Yamamoto et al. |
| 2018/0208834 A1* | 7/2018 | Goto ................. C07C 217/92 |

* cited by examiner

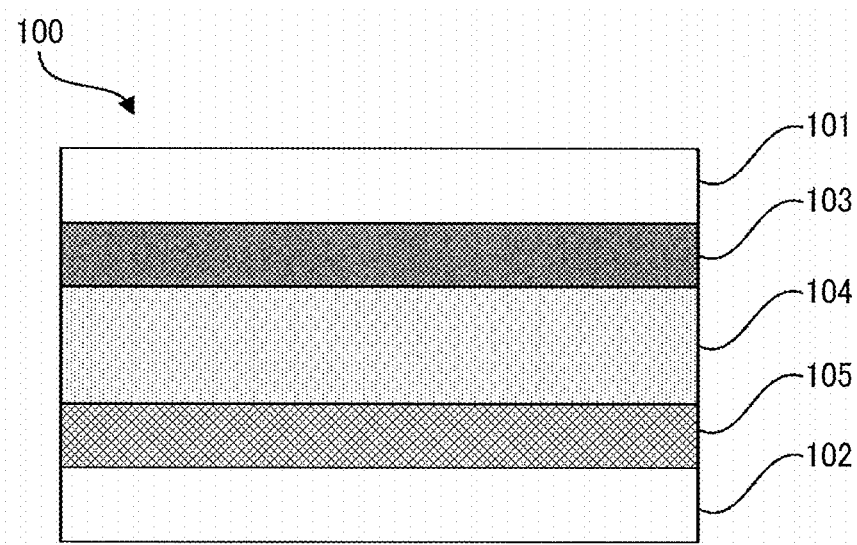

ELECTROCHROMIC DEVICE

CROSS-REFERENCE TO RELATED APPLICATIONS

This patent application is based on and claims priority pursuant to 35 U.S.C. § 119(a) to Japanese Patent Application Nos. 2018-073253 and 2019-057861, filed on Apr. 5, 2018 and Mar. 26, 2019, respectively, in the Japan Patent Office, the entire disclosure of each of which is hereby incorporated by reference herein.

BACKGROUND

Technical Field

The present disclosure relates to an electrochromic device.

Description of the Related Art

Electrochromism is a phenomenon displayed by a material of reversibly changing color as a redox reaction reversibly occurs in the material in response to application of voltage. Examples of the device utilizing electrochromism ("electrochromic device") include electronic paper, display, light control lens, light control window, light shielding filter, anti-glare mirror, touch panel key switch, light switch, light memory, and the like.

In a transparent electrochromic device such as a light control window, or in a color electrochromic device in which a plurality of color developing layers (electrochromic layers) developing different colors are laminated, the electrochromic layer needs to be transparent when in a neutral state.

In attempting to improve the contrast between the transparent state (decolored state) and the colored state, an electrochromic device in which multiple layers are solidified to form a multilayer structure has been proposed.

When the electrochromic layer is solid, ions are not able to quickly move in the electrochromic layer, and color development may be delayed upon application of voltage.

SUMMARY

In accordance with some embodiments of the present invention, an electrochromic device is provided. The electrochromic device includes a first electrode, a second electrode opposed to the first electrode at an interval, and an electrochromic layer between the first electrode and the second electrode. The electrochromic layer contains an electrochromic material and a first ion-conducting material partially comprising a non-ion-conducting portion that does not conduct ions. The non-ion-conducting portion comprises a molecular unit structure having an atomic arrangement in which 8 or more atoms having a valence of 2 or more are bonded with each other. The atoms comprise heteroatoms in a number of 15% or less based on a total number of the atoms.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawing, which is intended to depict example embodiments of the present invention and should not be interpreted to limit the scope thereof. The accompanying drawing is not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to an embodiment of the present invention, an electrochromic device that exhibits high transparency in a decolored state and quickly develops color upon application of voltage is provided.

Electrochromic Device

The electrochromic device according to an embodiment of the present invention includes a first electrode and a second electrode opposed to the first electrode at an interval. The electrochromic device further includes an electrochromic layer containing an electrochromic material and a first ion-conducting material partially comprising a non-ion-conducting portion that does not conduct ions.

The non-ion-conducting portion comprises a molecular unit structure having an atomic arrangement in which 8 or more atoms having a valence of 2 or more are bonded with each other, where the atoms comprise heteroatoms in a number of 15% or less based on a total number of the atoms. The electrochromic device may further include other members as necessary.

The present invention is achieved based on the finding that the conventional electrochromic devices exhibit low transparency in a decolored state and color development upon application of voltage is slow.

Specifically, for the purpose of increasing ion conductivity to accelerate color development upon application of voltage, a conventional technique of mixing an ion-conducting material with an electrochromic material that exhibits electrochromism has been proposed. However, in this technique, when the compatibility (affinity) of the electrochromic material with (for) the ion-conducting material is low, the electrochromic material and the ion-conducting material may not be uniformly mixed. In this case, the electrochromic layer becomes nonuniform and difficult to improve ion conductivity. Moreover, light scatters in the electrochromic layer, resulting in low transparency in a decolored state.

Even when the electrochromic layer contains a copolymer of the electrochromic material and the ion-conducting material, a phenomenon called polymerization-induced phase separation may occur when the compatibility between the electrochromic material and the ion-conducting material is low. As polymerization-induced phase separation occurs, the copolymer of the electrochromic material and the ion-conducting material does not become uniformly distributed in the electrochromic layer. In this case, the electrochromic layer becomes difficult to improve ion conductivity. Moreover, light scatters in the electrochromic layer, resulting in low transparency in a decolored state.

In the electrochromic device according to an embodiment of the present invention, the electrochromic layer has high uniformity and light is unlikely to scatter therein, thus exhibiting high transparency in a decolored state. Furthermore, in the electrochromic device according to an embodiment of the present invention, the electrochromic layer has high uniformity and therefore has improved ion conductivity, so that color development upon application of voltage can be accelerated.

Electrochromic Layer

The electrochromic layer refers to a layer which reversibly changes color as a redox reaction occurs in response to application of voltage.

The electrochromic layer contains an electrochromic material and a first ion-conducting material partially comprising a non-ion-conducting portion that does not conduct ions. The non-ion-conducting portion comprises a molecular unit structure having an atomic arrangement in which 8 or more atoms having a valence of 2 or more are bonded with each other, where the atoms comprise heteroatoms in a number of 15% or less based on a total number of the atoms.

The electrochromic layer is not particularly limited and can be appropriately selected according to the purpose as long as the electrochromic material and the first ion-conducting material are contained therein. The electrochromic layer may further contain other components.

The electrochromic layer preferably contains a copolymer of the electrochromic material and the first ion-conducting material.

The copolymer of the electrochromic material and the first ion-conducting material is not particularly limited and can be appropriately selected according to the purpose. The copolymer of the electrochromic material and the first ion-conducting material may be, for example, a random copolymer in which the electrochromic material and the first ion-conducting material are randomly arranged, or a block copolymer having a region where the electrochromic material is continuous and another region where the first ion-conducting material is continuous. The copolymer of the electrochromic material and the first ion-conducting material may also be a cross-linked body having a network cross-linked structure in which the molecules of the copolymer are bonded with each other.

A method of copolymerizing the electrochromic material and the first ion-conducting material may be, for example, a method in which a solution obtained by mixing the electrochromic material, the first ion-conducting material, a polymerization initiator, and a solvent is irradiated with ultraviolet light (UV) emitted from a UV irradiator to cause a polymerization.

The electrochromic layer is more improved in uniformity by containing the copolymer of the electrochromic material and the first ion-conducting material. Therefore, the electrochromic device exhibits high transparency in a decolored state and quickly develops color upon application of voltage.

The electrochromic layer may contain a mixture of a polymer of the electrochromic material and a polymer of the first ion-conducting material.

The mixture of a polymer of the electrochromic material and a polymer of the first ion-conducting material is not particularly limited and can be appropriately selected according to the purpose. The mixture of a polymer of the electrochromic material and a polymer of the first ion-conducting material may be obtained by, for example, separately polymerizing the electrochromic material and the first ion-conducting material to obtain each polymer and then mixing the polymers.

The thickness of the electrochromic layer is preferably from 0.2 to 5.0 μm. When the thickness of the electrochromic layer is from 0.2 to 5.0 μm, the contrast between a decolored state and a colored state and the transparency in a decolored state can be improved.

Electrochromic Material

The electrochromic material refers to a material which reversibly changes color as a redox reaction occurs in response to application of voltage.

In the present disclosure, the electrochromic material may refer to a monomer exhibiting electrochromism ("electrochromic monomer") or a monomer unit constituting a polymer of the electrochromic monomer. Further, in the present disclosure, when the electrochromic layer contains the copolymer of the electrochromic material and the first ion-conducting material, the electrochromic material may refer to a monomer unit constituting a portion of the copolymer where the electrochromic material is polymerized.

The electrochromic material is not particularly limited and can be selected according to the purpose. Specific examples of the electrochromic material include, but are not limited to, low-molecular-weight organic electrochromic materials of azobenzene type, anthraquinone type, diarylethene type, dihydroprene type, styryl type, styrylspiropyran type, spirooxazine type, spirothiopyran type, thioindigo type, tetrathiafulvalene type, terephthalic acid type, triphenylmethane type, triphenylamine type, naphthopyran type, viologen type, pyrazoline type, phenazine type, phenylenediamine type, phenoxazine type, phenothiazine type, phthalocyanine type, fluoran type, fulgide type, benzopyran type, metallocene type, and benzidine type; and conductive polymer compounds such as polyaniline and polythiophene. Each of these materials can be used alone or in combination with others. Among these, triphenylamine-based materials (triphenylamine derivatives) and benzidine-based materials (benzidine derivatives) are preferable.

The electrochromic material is preferably a monomer having a polymerizable functional group or a monomer unit constituting a polymer in which a polymerizable functional group is polymerized.

The polymerizable functional group is not particularly limited and can be appropriately selected according to the purpose. Examples of the polymerizable functional group include, but are not limited to, acrylic group, methacrylic group, epoxy group, oxetane group, vinyl group, vinyloxy group, allyl group, styryl group, maleoyl group, and cinnamoyl group. Each of these may be contained in the electrochromic material alone or in combination with others. Among these, acrylic group and methacrylic group are preferable.

Specific examples of the electrochromic material are shown below, but are not limited thereto.

Example Compound 1
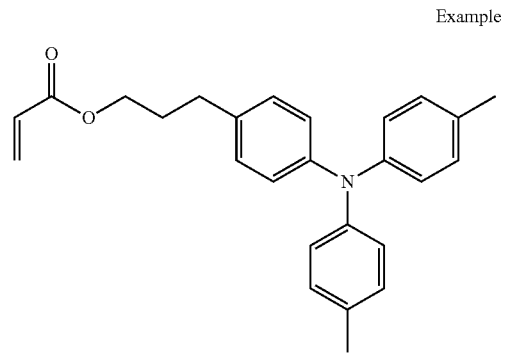
Example Compound 2
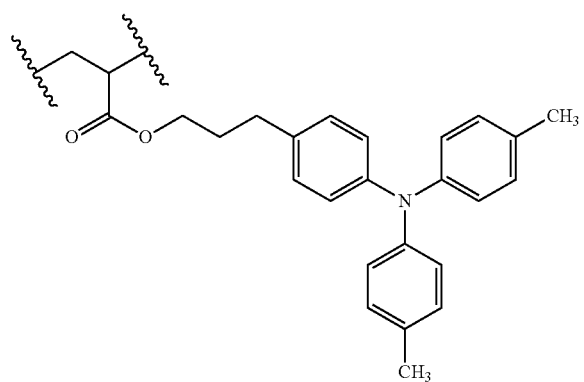
Example Compound 3
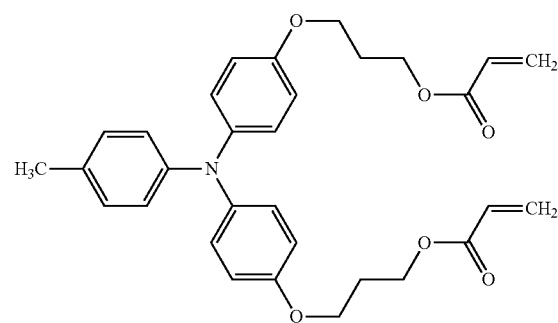
Example Compound 4
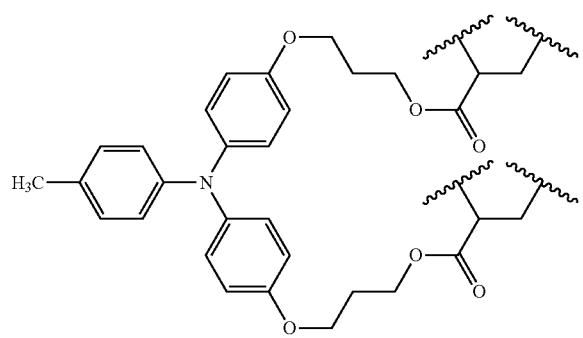
Example Compound 5
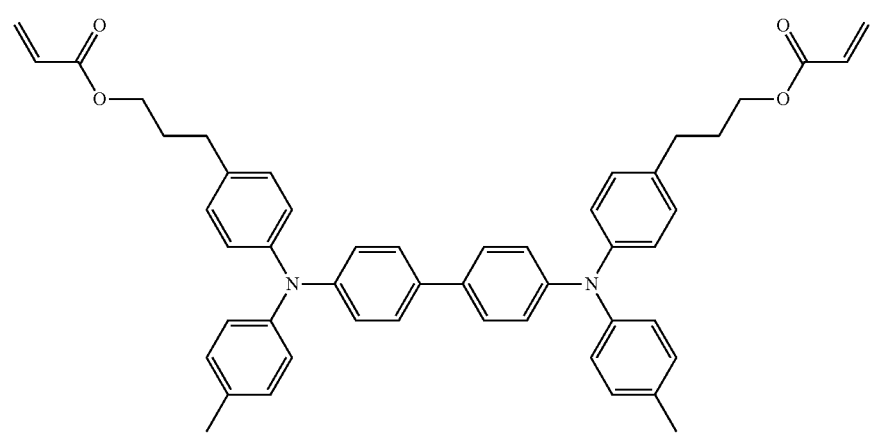

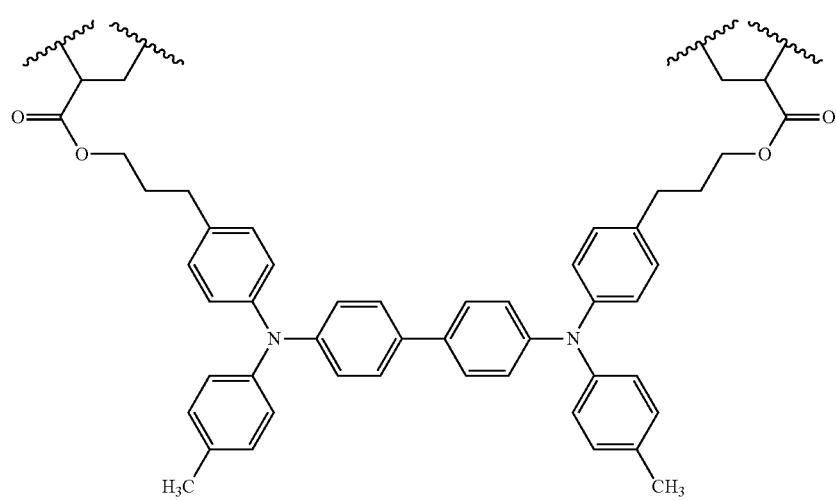

Example Compound 6

The proportion of the electrochromic material in the electrochromic layer is not particularly limited and can be selected according to the purpose, but is preferably from 10% to 90% by mass.

First Ion-Conducting Material

The ion-conducting material refers to a material that enhances ion conductivity of the electrochromic layer.

In the present disclosure, the first ion-conducting material may refer to a monomer enhancing ion conductivity ("ion-conducting monomer") or a monomer unit constituting a polymer of the ion-conducting monomer. Further, in the present disclosure, when the electrochromic layer contains the copolymer of the electrochromic material and the first ion-conducting material, the first ion-conducting material may refer to a monomer unit constituting a portion of the copolymer where the ion-conducting material is polymerized.

The first ion-conducting material is not particularly limited and can be appropriately selected according to the purpose as long as a non-ion-conducting portion (to be described later) is partially contained therein.

Non-Ion-Conducting Portion

The first ion-conducting material partially comprises a non-ion-conducting portion that does not conduct ions.

The non-ion-conducting portion is not particularly limited and can be appropriately selected according to the purpose as long as it comprises a molecular unit structure having an atomic arrangement in which 8 or more atoms having a valence of 2 or more are bonded with each other, where the atoms comprise heteroatoms in a number of 15% or less based on a total number of the atoms. Here, the total number of atoms refers to the total number of atoms other than hydrogen atoms, and the heteroatoms refer to atoms other than hydrogen atoms and carbon atoms.

The non-ion-conducting portion tends to exhibit hydrophobicity, so the compatibility with the electrochromic material exhibiting hydrophobicity is high. Therefore, the electrochromic layer is improved in uniformity, and the electrochromic device exhibits high transparency in a decolored state and quickly develops color upon application of voltage.

Examples of the non-ion-conducting portion include, but are not limited to, an alkyl group, an alkenyl group, an acyl group, an alkenoyl group, an alkyl phenyl group, a bis(alkyl phenyl) group, and a polycyclic phenyl group. Each of these may be contained in the first ion-conducting material alone or in combination with others.

Solubility Parameter

The non-ion-conducting portion preferably has a solubility parameter of from 7.5 to 13.

The solubility parameter is a value often used as an index of solubility of a material. In the present disclosure, a value (unit: $(cal/cm^3)^{0.5}$) calculated by the group contribution method by Fedors is used. When the solubility parameter of the non-ion-conducting portion is in the range of from 7.5 to 13, the compatibility between the ion-conducting material and the electrochromic material is increased, and the electrochromic layer is improved in uniformity. Therefore, the electrochromic device exhibits high transparency in a decolored state and quickly develops color upon application of voltage.

The first ion-conducting material preferably comprises an alkylene oxide structure.

The alkylene oxide structure is not particularly limited and can be appropriately selected according to the purpose. Examples of the alkylene oxide structure include, but are not limited to, an ethylene oxide structure, a propylene oxide structure, a trimethylene oxide structure, a butylene oxide structure, and a tetramethylene oxide structure. Each of these may be contained in the first ion-conducting material alone or in combination with others.

When the first ion-conducting material comprises an alkylene oxide structure that has high ion conductivity, the ion conductivity of the electrochromic layer is more improved. Therefore, the electrochromic device can develop color more quickly upon application of voltage.

Preferably, the alkylene oxide structure is an ethylene oxide structure.

Examples of the first ion-conducting material are described in detail below, but are not limited thereto.

For example, the first ion-conducting material may have a structure represented by the following general formula (2), (2-1), or (2-2).

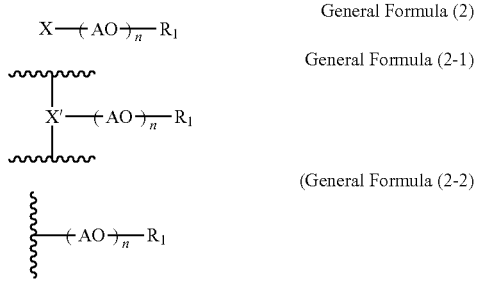

General Formula (2)

General Formula (2-1)

(General Formula (2-2))

In the general formulae (2), (2-1), and (2-2), $R_1$ represents an alkyl group, an alkenyl group, an acyl group, an alkenoyl group, an alkyl phenyl group, a bis(alkyl phenyl) group, or a polycyclic phenyl group, each having 8 or more carbon atoms. Further, in the general formulae (2), (2-1), and (2-2), AO represents an alkylene oxide, X represents a polymerizable functional group, and X' represents the polymerizable functional group being polymerized. In the general formulae (2), (2-1), and (2-2), n represents an integer of 1 or more, which indicates a structure in which both terminals of the alkylene oxide repeating structure are oxygen atoms. The general formula (2-1) represents a monomer unit of a polymer of the compound represented by the general formula (2), and the general formula (2-2) represents a unit obtained by removing the polymerizable group from the general formula (2-1).

Examples of the alkyl group include, but are not limited to, octyl group, ethylhexyl group, nonyl group, decyl group, lauryl group, tridecyl group, myristyl group, palmityl group, stearyl group, icosyl group, and docosyl group. The alkyl group may also be a polyvalent unsaturated alkyl group.

Examples of the alkenyl group include, but are not limited to, octenyl group, decenyl group, dodecenyl group, tetradecenyl group, hexadecenyl group, octadecenyl group, icocenyl group, and docosenyl group.

Examples of the acyl group include, but are not limited to, octanoyl group, decanoyl group, dodecanoyl group, tetradecanoyl group, hexadecanoyl group, octadecanoyl group, icosanoyl group, and docosanoyl group. The acyl group may also be a polyvalent unsaturated acyl group.

Examples of the alkenoyl group include, but are not limited to, octenoyl group, decenoyl group, dodecenoyl group, tetradecenoyl group, hexadecenoyl group, octadecenoyl group, icosenoyl group, and docosenoyl group.

Examples of the alkyl phenyl group include, but are not limited to, ethyl phenyl group, propyl phenyl group, butyl phenyl group, pentyl phenyl group, hexyl phenyl group, heptyl phenyl group, octyl phenyl group, nonyl phenyl group, decyl phenyl group, dodecyl phenyl group, tetradecyl phenyl group, hexadecyl phenyl group, octadecyl phenyl group, icosyl phenyl group, and docosyl phenyl group.

Examples of the bis(alkyl phenyl) group include, but are not limited to, those having a bisphenol skeleton, such as bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, and bisphenol Z.

Examples of the polycyclic phenyl group include, but are not limited to, naphthyl group, phenanthryl group, and anthryl group. In the general formula (2), the functional group represented by $R_1$ may have a substituent.

Examples of the polymerizable functional group include, but are not limited to, acrylic group, methacrylic group, epoxy group, oxetane group, vinyl group, vinyl oxy group, allyl group, styryl group, maleoyl group, and cinnamoyl group. Among these, acrylic group and methacrylic group are preferable for easy control of polymerization reactions and wide variety of combinations of monomers.

Examples of commercially available products of the first ion-conducting material represented by the general formula (2), (2-1), or (2-2) include, but are not limited to: BLEMMER 50POEP-800B, BLEMMER PLE200, BLEMMER PLE1300, BLEMMER PSE1300, BLEMMER ALE-200, BLEMMER ANP-300, and BLEMMER 75ANEP-600, manufactured by NOF CORPORATION; FANCRYL FA-314A and FANCRYL FA-318AS, manufactured by Hitachi Chemical Company, Ltd.; A-LEN-10 manufactured by Shin-Nakamura Chemical Co., Ltd.; and CD9075 available from ARKEMA K.K. (formerly SARTOMER JAPAN INC.). Examples thereof further include a monomer unit of a polymer of the above materials.

As another example, the first ion-conducting material may have a structure represented by the following general formula (3), (3-1), or (3-2).

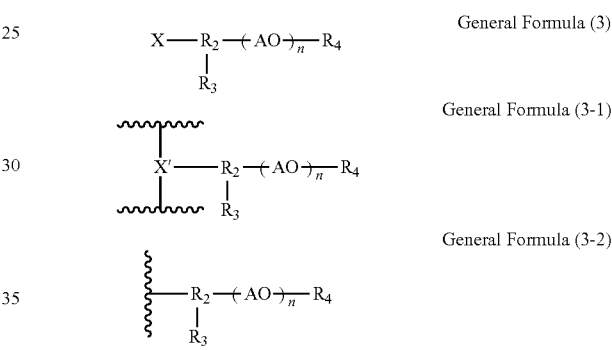

General Formula (3)

General Formula (3-1)

General Formula (3-2)

In the general formulae (3), (3-1), and (3-2), $R_2$ represents an alkoxy group, $R_3$ represents an alkyl group, an alkenyl group, an acyl group, an alkenoyl group, an alkyl phenyl group, a bis(alkyl phenyl) group, or a polycyclic phenyl group, each having 8 or more carbon atoms, and $R_4$ represents hydrogen atom or an alkyl group having 1 or more carbon atoms. Further, in the general formulae (3), (3-1), and (3-2), AO represents an alkylene oxide, X represents a polymerizable functional group, and X' represents the polymerizable functional group being polymerized. In the general formulae (3), (3-1), and (3-2), n represents an integer of 1 or more, which indicates a structure in which both terminals of the alkylene oxide repeating structure are oxygen atoms. The general formula (3-1) represents a monomer unit of a polymer of the compound represented by the general formula (3), and the general formula (3-2) represents a unit obtained by removing the polymerizable group from the general formula (3-1).

Examples of the alkoxy group include, but are not limited to, alkoxy groups derived from polyols having a valence of 2 or more, such as ethylene glycol, propanediol, butanediol, pentanediol, hexanediol, glycerin, tetritol, pentitol, hexitol, inositol, sucrose, glucose, fructose, and trehalose. In the general formula (3), the functional group represented by $R_2$ may have a substituent.

Examples of the functional group represented by $R_3$ in the general formulae (3), (3-1), and (3-2) are the same as examples of the functional group represented by $R_1$ in the general formulae (2), (2-1), and (2-2). When $R_4$ in the general formulae (3), (3-1), and (3-2) is an alkyl group, examples of the alkyl group include, in addition to examples of the alkyl group represented by $R_1$ in the general formulae (2), (2-1), and (2-2), methyl group, ethyl group, propyl group, isopropyl group, butyl group, isobutyl group, t-butyl group, pentyl group, 2-pentyl group, 3-pentyl group, 2-methylbutyl group, 3-methylbutyl group, 2-methyl-2-butyl group, 3-methyl-2-butyl group, neopentyl group, hexyl group, and heptyl group. Examples of the polymerizable functional group represented by X in the general formulae (3), (3-1), and (3-2) are the same as examples of the polymerizable functional group represented by X in the general formulae (2), (2-1), and (2-2).

Examples of commercially available products of the first ion-conducting material represented by the general formula (3), (3-1), or (3-2) include, but are not limited to: AKUARON KH-10, AKUARON KH-1025, and AKUARON KH-05, manufactured by DKS Co., Ltd.; and ADEKA REASOAP ER-10, ADEKA REASOAP ER-20, ADEKA REASOAP ER-30, ADEKA REASOAP ER-40, ADEKA REASOAP NE-10, ADEKA REASOAP NE-20, and ADEKA REASOAP NE-30, manufactured by ADEKA CORPORATION. Examples thereof further include a monomer unit of a polymer of the above materials.

As another example, the first ion-conducting material may have a structure represented by the following general formula (4), (4-1), or (4-2).

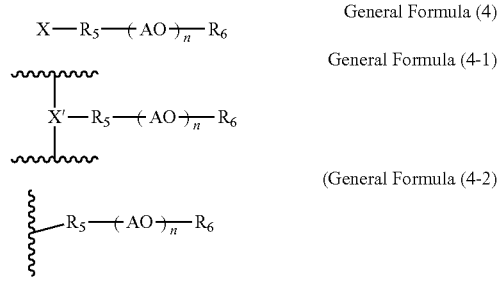

General Formula (4)

General Formula (4-1)

(General Formula (4-2)

In the general formulae (4), (4-1), and (4-2), $R_5$ represents an alkyl group, an alkenyl group, an acyl group, an alkenoyl group, an alkyl phenyl group, a bis(alkyl phenyl) group, or a polycyclic phenyl group, each having 8 or more carbon atoms, and $R_6$ represents hydrogen atom or an alkyl group having 1 or more carbon atoms. Further, in the general formulae (4), (4-1), and (4-2), AO represents an alkylene oxide, X represents a polymerizable functional group, and X' represents the polymerizable functional group being polymerized. In the general formulae (4), (4-1), and (4-2), n represents an integer of 1 or more, which indicates a structure in which both terminals of the alkylene oxide repeating structure are oxygen atoms. The general formula (4-1) represents a monomer unit of a polymer of the compound represented by the general formula (4), and the general formula (4-2) represents a unit obtained by removing the polymerizable group from the general formula (4-1).

Examples of the functional group represented by $R_5$ in the general formulae (4), (4-1), and (4-2) are the same as examples of the functional group represented by $R_1$ in the general formulae (2), (2-1), and (2-2). When $R_6$ in the general formulae (4), (4-1), and (4-2) is an alkyl group, examples of the alkyl group include examples of the alkyl group represented by $R_4$ in the general formulae (3), (3-1), and (3-2). Examples of the polymerizable functional group represented by X in the general formulae (4), (4-1), and (4-2) are the same as examples of the polymerizable functional group represented by X in the general formulae (2), (2-1), and (2-2).

Examples of commercially available products of the first ion-conducting material represented by the general formula (4), (4-1), or (4-2) include, but are not limited to: AKUARON RN-20, AKUARON RN-2025, AKUARON RN-30, and AKUARON RN-50, manufactured by DKS Co., Ltd. Examples thereof further include a monomer unit of a polymer of the above materials.

As a preferred example, the first ion-conducting material may have a structure represented by the following general formula (5), (5-1), or (5-2).

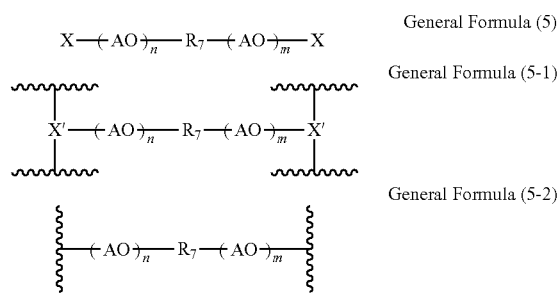

General Formula (5)

General Formula (5-1)

General Formula (5-2)

In the general formulae (5), (5-1), and (5-2), $R_7$ represents an alkyl group, an alkenyl group, an acyl group, an alkenoyl group, an alkyl phenyl group, a bis(alkyl phenyl) group, or a polycyclic phenyl group, each having 8 or more carbon atoms. Further, in the general formulae (5), (5-1), and (5-2), AO represents an alkylene oxide, X represents a polymerizable functional group, and X' represents the polymerizable functional group being polymerized. In the general formulae (5), (5-1), and (5-2), each of n and m independently represents an integer of 1 or more, which indicates a structure in which both terminals of the alkylene oxide repeating structure are oxygen atoms. The general formula (5-1) represents a monomer unit of a polymer of the compound represented by the general formula (5), and the general formula (5-2) represents a unit obtained by removing the polymerizable group from the general formula (5-1).

Examples of the functional group represented by $R_7$ in the general formulae (5), (5-1), and (5-2) are the same as examples of the functional group represented by $R_1$ in the general formulae (2), (2-1), and (2-2). Examples of the polymerizable functional group represented by X in the general formulae (5), (5-1), and (5-2) are the same as examples of the polymerizable functional group represented by X in the general formulae (2), (2-1), and (2-2).

When the compound represented by the general formula (5), (5-1), or (5-2) is used as the ion-conducting material, the electrochromic layer becomes more easily compatible with the other layers at the interface therebetween, thereby enhancing adhesiveness between the layers in the electrochromic device.

As a more preferred example, the first ion-conducting material may have a structure represented by the following general formula (6), (6-1), (6-2), (7), (7-1), or (7-2).

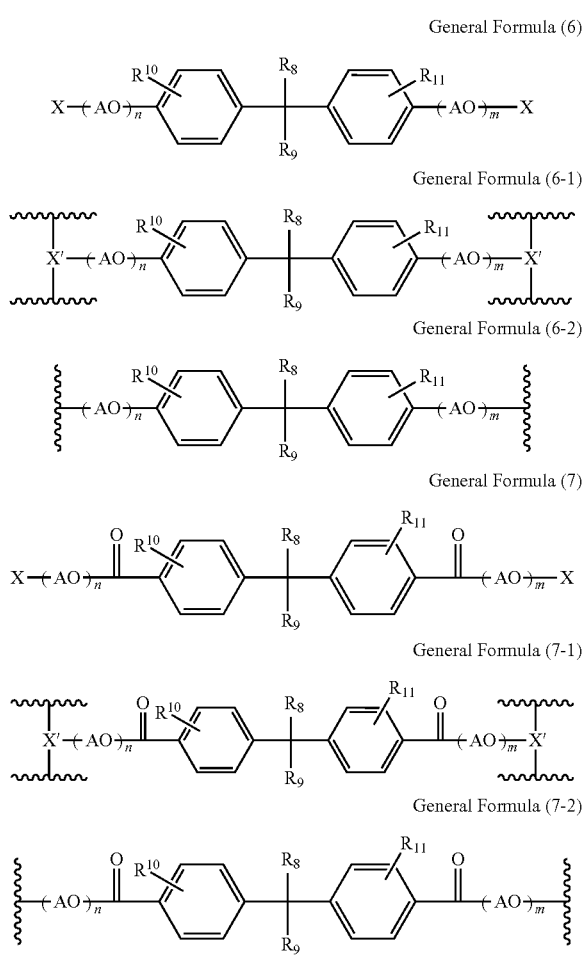

General Formula (6)

General Formula (6-1)

General Formula (6-2)

General Formula (7)

General Formula (7-1)

General Formula (7-2)

In the general formulae (6), (6-1), (6-2), (7), (7-1), and (7-2), each of $R_8$, $R_9$, $R_{10}$, and $R_{11}$ independently represents hydrogen atom, an alkyl group or an aryl group, each having 1 or more carbon atoms. Further, in the general formulae (6), (6-1), (6-2), (7), (7-1), and (7-2), AO represents an alkylene oxide, X represents a polymerizable functional group, and X' represents the polymerizable functional group being polymerized. In the general formulae (6), (6-1), (6-2), (7), (7-1), and (7-2), each of n and m independently represents an integer of 1 or more, which indicates a structure in which both terminals of the alkylene oxide repeating structure are oxygen atoms. The general formulae (6-1) and (7-1) respectively represent monomer units of polymers of the compounds represented by the general formulae (6) and (7), and the general formulae (6-2) and (7-2) respectively represent units obtained by removing the polymerizable group the general formulae (6-1) and (7-1).

When each of $R_8$, $R_9$, $R_{10}$, and $R_{11}$ in the general formulae (6), (6-1), (6-2), (7), (7-1), and (7-2) is an alkyl group, examples of the alkyl group include examples of the alkyl group represented by $R_4$ in the general formulae (3), (3-1), and (3-2).

Examples of the aryl group include, but are not limited to, phenyl group, benzyl group, and tolyl group.

Examples of commercially available products of the first ion-conducting material represented by the general formula (6), (6-1), (6-2), (7), (7-1), or (7-2) include, but are not limited to: BLEMMER series such as BLEMMER PDBE-200A, BLEMMER PDBE-250, BLEMMER PDBE-450A, and BLEMMER PDBE-1300, manufactured by NOF CORPORATION; FANCRYL FA-321A, FANCRYL FA-324A, FANCRYL FA-320M, FANCRYL FA-321M, and FANCRYL FA-3218M, manufactured by Hitachi Chemical Company, Ltd.; A-B1206PE, ABE-300, A-BPE-10, A-BPR-20, A-BPE-30, A-BPE-4, A-BPEF, A-BPP-3, BPE-80N, BPE-100, BPE-200, BPE-500, BPE-900, and BPE-1300N, manufactured by Shin-Nakamura Chemical Co., Ltd.; KAYARAD R-551 and KAYARAD R-712, manufactured by Nippon Chemical Industrial Co., Ltd.; and SR349NS, SR601NS, SR602NS, SR9038, SR101, SR150, SR348NS, SR480NS, SR540, SR541, and SR9036, available from ARKEMA K.K. (formerly SARTOMER JAPAN INC.). Examples thereof further include a monomer unit of a polymer of the above materials.

As a more preferred example, the first ion-conducting material may have a structure represented by the following general formula (1), (1-1), or (1-2).

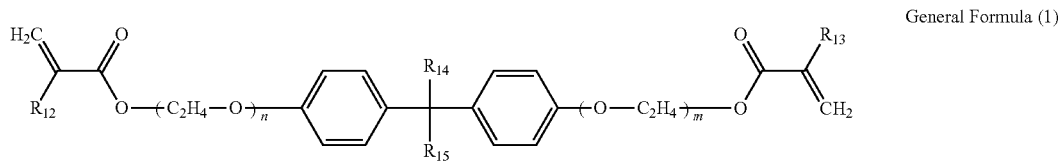

General Formula (1)

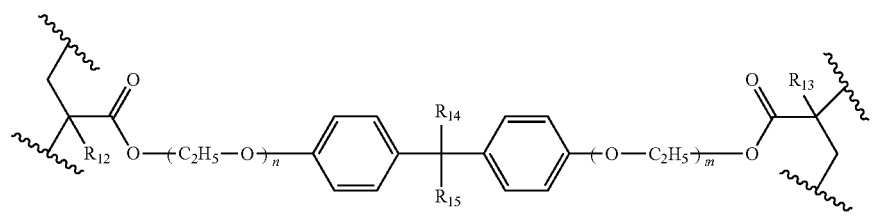

General Formula (1-1)

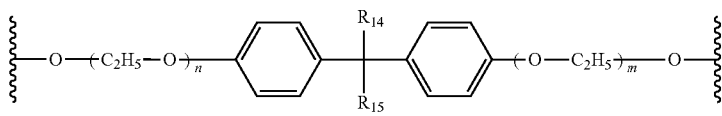

General Formula (1-2)

In the general formulae (1), (1-1), and (1-2), each of $R_{14}$ and $R_{15}$ independently represents hydrogen atom, an alkyl group having 1 or more carbon atoms or phenyl group, and each of $R_{12}$ and $R_{13}$ independently represents hydrogen atom or methyl group. In the general formulae (1), (1-1), and (1-2), each of n and m independently represents an integer of 1 or more. The general formula (1-1) represents a monomer unit of a polymer of the compound represented by the general formula (1), and the general formula (1-2) represents a unit obtained by removing the polymerizable group from the general formula (1-1).

When at least one of $R_{14}$ and $R_{15}$ in the general formulae (1), (1-1), and (1-2) is an alkyl group, examples of the alkyl group include examples of the alkyl group represented by $R_4$ in the general formulae (3), (3-1), and (3-2).

In the general formulae (1), (1-1), and (1-2), n and m are not particularly limited and can be appropriately selected according to the purpose. Preferably, n+m is in the range of from 2 to 50, more preferably from 5 to 30.

When the compound represented by the general formula (1), (1-1), or (1-2) is used as the first ion-conducting material, the compatibility between the electrochromic material and the first ion-conducting material is particularly increased while the ion conductivity of the electrochromic layer is improved. Therefore, when the compound represented by the general formula (1), (1-1), or (1-2) is used as the first ion-conducting material, the electrochromic device exhibits high transparency in a decolored state and quickly develops color upon application of voltage.

Examples of commercially available products of the first ion-conducting material represented by the general formula (1), (1-1), or (1-2) include, but are not limited to: BLEMMER PDBE-250, BLEMMER PDBE-450A, and BLEMMER PDBE-1300, manufactured by NOF CORPORATION; FANCRYL FA-321 A, FANCRYL FA-321M, and FANCRYL FA-3218M, manufactured by Hitachi Chemical Company, Ltd.; A-BPE-10, A-BPR-20, A-BPE-30, BPE-500, BPE-900, and BPE-1300N, manufactured by Shin-Nakamura Chemical Co., Ltd.; and SR602NS, SR9038, SR48ONS, SR541, and SR9036, available from ARKEMA K.K. (formerly SARTOMER JAPAN INC.). Examples thereof further include a monomer unit of a polymer of the above materials.

The proportion of the first ion-conducting material in the electrochromic layer is not particularly limited and can be selected according to the purpose, but is preferably from 10% to 90% by mass.

Other Components

The electrochromic layer may further contain other components, such as a second ion-conducting material, a polymerization initiator, a solvent, a diluent, a cross-linker, an adhesion improver, a conductive aid, a binder, and a filler. Among these, the second ion-conducting material is preferably contained. The other components may be separately mixed with the electrochromic material and the first ion-conducting material, or may be further copolymerized after being mixed therewith.

The second ion-conducting material is not particularly limited and can be appropriately selected according to the purpose as long as it has ion conductivity. That is, the second ion-conducting material may not comprise a non-ion-conducting portion.

When the electrochromic layer contains the second ion-conducting material, the ion conductivity of the electrochromic layer is more improved. Therefore, the electrochromic device can develop color more quickly upon application of voltage.

Preferably, the electrochromic layer contains a copolymer of the electrochromic material, the first ion-conducting material, and the second ion-conducting material. When the electrochromic layer contains the copolymer, the electrochromic device can develop color more quickly upon application of voltage.

The electrochromic layer may contain a mixture of a polymer of the electrochromic material, a polymer of the first ion-conducting material, and a polymer of the second ion-conducting material.

Examples of the second ion-conducting material include, but are not limited to, an alkylene oxide derivative having an alkylene oxide structure.

The alkylene oxide structure is not particularly limited and can be appropriately selected according to the purpose. Examples of the alkylene oxide structure include, but are not limited to, an ethylene oxide structure, a propylene oxide structure, a trimethylene oxide structure, a butylene oxide structure, and a tetramethylene oxide structure. Each of these may be contained in the second ion-conducting material alone or in combination with others.

When the second ion-conducting material comprises an alkylene oxide structure that has high ion conductivity, the ion conductivity of the electrochromic layer is more improved. Therefore, the electrochromic device can develop color more quickly upon application of voltage.

The second ion-conducting material preferably has a structure in which a polymerizable functional group is added to the above-described alkylene oxide structure.

The polymerizable functional group is not particularly limited and can be appropriately selected according to the purpose. Examples of the polymerizable functional group include, but are not limited to, acrylic group, methacrylic group, epoxy group, oxetane group, vinyl group, vinyloxy group, allyl group, styryl group, maleoyl group, and cinnamoyl group. Each of these may be contained in the second ion-conducting material alone or in combination with others. Among these, acrylic group and methacrylic group are preferable for easy control of polymerization reactions and wide variety of combinations of monomers.

Examples of the compound having a structure in which a polymerizable functional group is added to an alkylene oxide structure, which can be used as the second ion-conducting material, include, but are not limited to, polyethylene glycol monoacrylate, polyethylene glycol monomethyl ether monoacrylate, polyethylene glycol diacrylate, polyethylene glycol monomethacrylate, polyethylene glycol monomethyl ether monomethacrylate, and polyethylene glycol dimethacrylate.

Examples of commercially available products of the second ion-conducting material include, but are not limited to, BLEMMER AME400, BLEMMER ADE400, BLEMMER PE90, BLEMMER PE200, BLEMMER PE350, BLEMMER AE90, BLEMMER AE200, BLEMMER AE400, BLEMMER PME100, BLEMMER PME200, BLEMMER PME400, BLEMMER PME1000, BLEMMER PME4000, BLEMMER PDE100, BLEMMER PDE150, BLEMMER PDE200, BLEMMER PDE400, BLEMMER PDE600, BLEMMER ADE200, BLEMMER ADE300, and BLEMMER ADE600.

The polymerization initiator is not particularly limited and can be appropriately selected according to the purpose. Examples of the polymerization initiator include, but are not limited to, thermal polymerization initiators and photopolymerization initiators. Photopolymerization initiators are preferable for efficiency of polymerization.

Specific examples of the thermal polymerization initiators include, but are not limited to: peroxide initiators such as 2,5-dimethylhexane-2,5-dihydroperoxide, dicumyl peroxide, benzoyl peroxide, t-butylcumyl peroxide, 2,5-dimethyl-2,5-di(peroxybenzoyl)hexine-3, di-t-butyl peroxide, t-butyl hydroperoxide, cumene hydroperoxide, and lauroyl peroxide; and azo initiators such as azobisisobutyronitrile, azobiscyclohexanecarbonitrile, azobis(methyl isobutyrate), azobisisobutyl amidine hydrochloride, and 4,4'-azobis-4-cyanovaleric acid. Each of these materials can be used alone or in combination with others.

Specific examples of the photopolymerization initiators include, but are not limited to: acetophenone or ketal photopolymerization initiators such as diethoxyacetophenone, 2,2-dimethoxy-1,2-diphenylethane-1-one, 1-hydroxy-cyclohexyl-phenyl-ketone, 4-(2-hydroxyethoxy)phenyl-(2-hydroxy-2-propyl) ketone, 2-benzyl-2-dimethylamino-1-(4-morpholinophenyl)butanone-1,2-hydroxy-2-methyl-1-phenylpropane-1-one, 2-methyl-2-morpholino(4-methylthiophenyl)propane-1-one, and 1-phenyl-1,2-propanedione-2-(o-ethoxycarbonyl)oxime; benzoin ether photopolymerization initiators such as benzoin, benzoin methyl ether, benzoin ethyl ether, benzoin isobutyl ether, and benzoin isopropyl ether; benzophenone photopolymerization initiators such as benzophenone, 4-hydroxybenzophenone, methyl o-benzoylbenzoate, 2-benzoyl naphthalene, 4-benzoyl biphenyl, 4-benzoyl phenyl ether, acrylated benzophenone, and 1,4-benzoyl benzene; and thioxanthone photopolymerization initiators such as 2-isopropyl thioxanthone, 2-chlorothioxanthone, 2,4-dimethylthioxanthone, 2,4-diethylthioxanthone, and 2,4-dichlorothioxanthone.

Specific examples of the photopolymerization initiators further include, but are not limited to, ethylanthraquinone, 2,4,6-trimethylbenzoyldiphenylphosphine oxide, 2,4,6-trimethylbenzoylphenylethoxyphosphine oxide, bis(2,4,6-trimethylbenzoyl)phenylphosphine oxide, bis(2,4-dimethoxybenzoyl)-2,4,4-trimethylpentylphosphine oxide, methylphenylglyoxy ester, 9,10-phenanthrene, acridine compounds, triazine compounds, and imidazole compounds. Each of these materials can be used alone or in combination with others.

In addition, a photopolymerization accelerator may be used alone or in combination with the photopolymerization initiator. Specific examples of the photopolymerization accelerator include, but are not limited to, triethanolamine, methyldimethanolamine, ethyl 4-dimethylaminobenzoate, isoamyl 4-dimethylaminobenzoate, (2-dimethylamino)ethyl benzoate, and 4,4'-dimethylaminobenzophenone.

First Electrode and Second Electrode

The first electrode and the second electrode are opposed to each other at an interval.

The material of the first electrode and the second electrode is not particularly limited and can be appropriately selected according to the purpose as long as it is a transparent material having conductivity. Specific examples of such a material include, but are not limited to, inorganic materials such as tin-doped indium oxide (hereinafter "ITO"), fluorine-doped tin oxide (hereinafter "FTO"), antimony-doped tin oxide (hereinafter "ATO"), and zinc oxide. Among these, InSnO, GaZnO, SnO, $In_2O_3$, and ZnO are preferable.

Alternatively, an electrode having improved conductivity while maintaining transparency may be used, formed of a fine network structure of transparent carbon nanotube or other highly-conductive non-transmissive materials such as Au, Ag, Pt, and Cu.

The thicknesses of the first electrode and the second electrode are so adjusted that these electrodes have proper electrical resistance values required for causing a redox reaction in the electrochromic layer. In a case in which the first electrode and the second electrode each comprise ITO, the average thicknesses of each of the first electrode and the second electrode is preferably from 50 to 500 nm.

The first electrode and the second electrode may be formed by for example, vacuum vapor deposition, sputtering, or ion plating. The first electrode and the second electrode can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

Other Members

Other members to be included in the electrochromic device are not particularly limited and can be selected according to the purpose. For example, the electrochromic device may further include an electrolyte layer, a counter electrode reaction layer, a substrate, a sealing material, and/or a protective layer.

The electrolyte layer is interposed in between the first electrode and the second electrode.

Preferably, the electrolyte layer is interposed between the electrochromic layer and a counter electrode reaction layer (described later), in between the first electrode and the second electrode.

Examples of the material of the electrolyte layer include, but are not limited to: inorganic ion salts such as alkali metal salts and alkali-earth metal salts; quaternary ammonium salts; and supporting salts of acids and bases. Specific examples thereof include, but are not limited to, $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$.

As the material of the electrolyte layer, an ionic liquid may also be used. In particular, an organic ionic liquid is preferable for its molecular structure that exhibits liquidity in a wide temperature range including room temperature.

Specific examples of cationic components in such a molecular structure that exhibits liquidity in a wide temperature range including room temperature include, but are not limited to: imidazole derivatives such as N,N-dimethylimidazole salt, N,N-methylethylimidazole salt, and N,N-methylpropylimidazole salt; pyridinium derivatives such as N,N-dimethylpyridinium salt and N,N-methylpropylpyridinium salt; and aliphatic quaternary ammonium salts such as trimethylpropylammonium salt, trimethylhexylammonium salt, and triethylhexylammonium salt.

Specific preferred examples of anionic components therein include, but are not limited to, fluorine-containing compounds such as $BF_4^-$, $CF_3SO_3^-$, $PF_4^-$, and $(CF_3SO_2)_2N^-$, for stability in the atmosphere.

As the material of the electrolyte layer, an ionic liquid in which the above-described cationic component and anion component are arbitrarily combined is preferably used.

The ionic liquid may be directly dissolved in a photopolymerizable monomer, an oligomer, or a liquid crystal material. When the solubility is poor, the ionic liquid may be first dissolved in a small amount of a solvent for the electrolyte layer, and thereafter mixed with a photopolymerizable monomer, an oligomer, or a liquid crystal material.

Specific examples of the solvent for the electrolyte layer include, but are not limited to, propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, alcohols, and mixed solvents thereof.

The electrolyte layer needs not necessarily be a low-viscosity liquid and may be in the form of a gel, cross-linked polymer, or liquid crystal dispersion. The electrolyte layer in the form of a gel or solid is advantageous for improving strength and reliability of the electrochromic device.

The electrolyte layer is preferably solidified by a method of holding an electrolyte and an electrolyte layer solvent in a polymer resin for improving ion conductivity and solid strength of the electrolyte layer.

Specific preferred examples of the polymer resin include photocurable resins, because an element can be produced at a lower temperature within a shorter time period as compared with a method of thinning the film by thermal polymerization or solvent evaporation.

The average thickness of the electrolyte layer is not particularly limited and can be appropriately selected according to the purpose, but is preferable from 100 nm to 100 μm.

The counter electrode reaction layer is interposed in between the first electrode and the second electrode.

Preferably, the counter electrode reaction layer is interposed between the electrolyte layer and the second electrode, in between the first electrode and the second electrode.

The counter electrode reaction layer undergoes the reverse reaction with respect to the electrochromic layer to balance the charge therebetween, so that at least one of the first electrode and the second electrode is prevented from being corroded and deteriorated by an irreversible redox reaction. Specifically, the reverse reaction with respect to the electrochromic layer refers to a reduction reaction when the electrochromic layer undergoes an oxidization reaction or an oxidation reaction when the electrochromic layer undergoes a reduction reaction. The reverse reaction with respect to the electrochromic layer also includes the action of the counter electrode reaction layer as a capacitor.

The material of the counter electrode reaction layer is not particularly limited and can be appropriately selected depending on the purpose as long as it undergoes the reverse reaction with respect to the electrochromic layer. Specific examples of the material of the counter electrode reaction layer include, but are not limited to, antimony tin oxide, nickel oxide, titanium oxide, zinc oxide, tin oxide, and conducting or semiconducting metal oxides containing two or more of these materials.

The counter electrode reaction layer is preferably formed of a porous thin film that does not inhibit injection of the electrolyte from the electrolyte layer. Specifically, the counter electrode reaction layer is formed by fixing fine particles of conducting or semiconducting metal oxides, such as antimony tin oxide, nickel oxide, titanium oxide, zinc oxide, and tin oxide, to the second electrode with a binder of acrylic type, alkyd type, isocyanate type, urethane type, epoxy type, or phenol type. A suitable counter electrode reaction layer can be formed of a porous thin film that does not inhibit injection of the electrolyte from the electrolyte layer.

The counter electrode reaction layer may also be a second electrochromic layer formed of the same material as the above-described electrochromic layer.

The substrate is not particularly limited and can be appropriately selected according to the purpose as long as it is a transparent material capable of supporting the members forming the electrochromic device. For example, any known inorganic and organic material may be used for the substrate.

Specific examples of the inorganic material usable for the substrate include, but are not limited to, a glass substrate made of non-alkali-glass, borosilicate glass, float glass, or soda-lime glass.

Specific examples of the organic material usable for the substrate include, but are not limited to, a resin substrate made of polycarbonate resin, acrylic resin, polyethylene, polyvinyl chloride, polyester, epoxy resin, melamine resin, phenol resin, polyurethane resin, or polyimide resin.

The shape of the substrate is not particularly limited and can be appropriately selected according to the purpose. For example, the substrate may be in a rectangular shape or a circular shape. The substrate may be a laminated body of multiple substrates. For example, a structure in which the electrochromic device is sandwiched between two glass substrates provides improved vapor barrier property and gas barrier property.

The substrate may have a surface coating such as a transparent insulating layer, a UV cut layer, and/or an antireflection layer, for improving at least one of vapor barrier property, gas barrier property, ultraviolet resistance, and visibility.

The sealing material is not particularly limited and can be selected according to the purpose as long as the side surface of the electrochromic device can be sealed thereby. Examples of the sealing material include, but are not limited to, ultraviolet-curable or heat-curable resins such as acrylic resin, urethane resin, and epoxy resin.

By sealing the side surface of the electrochromic device with the sealing material, leakage of the electrolyte and infiltration of moisture and oxygen in the atmosphere can be prevented. Therefore, the electrochromic device having the sealing material can operate more stably.

The protective layer is not particularly limited and can be selected according to the purpose as long as the entire electrochromic device can be protected thereby. Examples of the material of the protective layer include, but are not limited to, ultraviolet-curable or heat-curable resins such as acrylic resin, urethane resin, and epoxy resin.

The thickness of the protective layer is not particularly limited and can be selected according to the purpose, but is preferably from 1 to 200 μm.

The electrochromic device having the protective layer is improved in resistance to external stress and chemicals.

Next, the electrochromic device according to an embodiment of the present invention is described with reference to the drawing.

An electrochromic device 100 illustrated in the drawing includes a first electrode 101 and a second electrode 102 opposed to the first electrode 101 at an interval. The electrochromic device 100 further includes an electrochromic layer 103, an electrolyte layer 104, and a counter electrode reaction layer 105 disposed in this order from the first electrode 101 side between the first electrode 101 and the second electrode 102.

As a voltage is applied to the first electrode 101 and the second electrode 102 of the electrochromic device 100, the electrochromic material contained in the electrochromic layer 103 undergoes a redox reaction, and the electrochromic layer 103 develops a color. By contrast, as a voltage of the opposite sign to the voltage applied to cause the electrochromic layer 103 to develop a color is applied to the first electrode 101 and the second electrode 102, the electrochromic layer 103 in a colored state can be returned to a decolored state.

EXAMPLES

The present invention is described in more detail below, but the present invention is not limited to the following Examples.

Example 1

Preparation of Electrochromic Layer

First, the Example Compound 2 and the Example Compound 3 as electrochromic materials, BLEMMER 50POEP-800B (manufactured by NOF CORPORATION) as a first ion-conducting material, and IRGACURE 184 (manufactured by BASF SE) as a polymerization initiator, and 2-butanone (manufactured by Wako Pure Chemical Industries, Ltd.) as a solvent were mixed at a mass ratio of 3:7:9.9:0.1:80 as shown in Table 1, to obtain a solution 1. The solubility parameter of the non-ion-conducting portion of BLEMMER 50POEP-800B is 7.83.

Subsequently, an ITO glass substrate (having an area of 40 mm×40 mm, a thickness of 0.7 mm, and an ITO film thickness of about 100 nm) as a first electrode was coated with the solution 1 by spin coating, and the solution 1 was dried. Thereafter, the solution 1 dried on the ITO glass substrate was cured by irradiation with UV (having a wavelength of 250 nm) by a UV irradiator (SPOT CURE manufactured by Ushio Inc.) in a nitrogen atmosphere. Thus, an electrochromic layer having a thickness of 1.3 μm was prepared on the ITO glass substrate as the first electrode.

Preparation of Counter Electrode Reaction Layer

Another ITO glass substrate (having an area of 40 mm×40 mm, a thickness of 0.7 mm, and an ITO film thickness of about 100 nm) as a second electrode was coated with a titanium oxide nanoparticle dispersion liquid (SP210 available from Showa Titanium Co., Ltd., having an average particle diameter of about 20 nm) by spin coating, to prepare a counter electrode reaction layer. Subsequently, an annealing treatment was performed at 120 degrees C. for 15 minutes. Thus, a nanostructural semiconducting material comprising a titanium oxide particle film having a thickness of about 2.5 μm was formed as the counter electrode reaction layer.

Preparation of Electrolyte Layer

First, 195 parts by weight of BLEMMER AME400 (manufactured by NOF CORPORATION), 195 parts by weight of BLEMMER ADE400A (manufactured by NOF CORPORATION), 10 parts by weight of IRGACURE 184 (manufactured by BASF SE) as a polymerization initiator, and 60 parts by weight of ethylmethylimidazolium bisfluorosulfonimide (EMIMFSI manufactured by Kanto Chemical Co., Inc.) as an ionic liquid were mixed, to obtain a monomer composition liquid. Next, 30 mg of the monomer composition liquid was measured with a micro-pipette and dropped onto the counter electrode reaction layer side of the ITO glass substrate having the counter electrode reaction layer. Thus, an electrolyte layer comprising the monomer composition liquid was prepared.

Preparation of Electrochromic Device

The ITO glass substrate (first electrode) having the electrochromic layer and the ITO glass substrate (second electrode) having the counter electrode reaction layer and the electrolyte layer were bonded together such that the electrochromic layer and the electrolyte layer were in contact with each other, to obtain a bonded element.

The obtained bonded element was irradiated with UV (having a wavelength of 250 nm) at 10 mW for 60 seconds by a UV irradiator (SPOT CURE manufactured by Ushio Inc.). Thus, an electrochromic device 1 was prepared.

Examples 2 to 75

Electrochromic devices 2 to 75 were each prepared in the same manner as in Example 1 except that the composition of the electrochromic layer was changed to those shown in Tables 1 to 11 below.

Comparative Examples 1 and 2

Electrochromic devices 76 and 77 were each prepared in the same manner as in Example 1 except that the composition of the electrochromic layer was changed to those shown in Tables 1 to 11 below.

Evaluations

Haze

The electrochromic devices prepared in Examples 1 to 75 and Comparative Examples 1 to 2, in a decolored state, were subjected to a measurement of the haze value at the center of the coloring region thereof using a haze meter (DNH-5000 manufactured by NIPPON DENSHOKU INDUSTRIES CO., LTD.). The haze value was measured by a method in accordance with JIS (Japanese Industrial Standards) K 7136. The measured haze values are shown in Tables 1 to 11.

Here, the haze refers to the degree of cloudiness of an object. For example, the haze value of a completely transparent object is 0, and an object with a high haze value looks cloudy. That is, the lower the haze value, the higher the transparency in a decolored state. Therefore, in the electrochromic device according to an embodiment of the present invention, the haze value is preferably 2 or less, more preferably 1 or less.

Responsiveness

The electrochromic devices prepared in Examples 1 to 75 and Comparative Examples 1 and 2 were each applied with a voltage of −1.6 V for 5 seconds to cause the electrochromic devices to develop color. At this time, the light transmittance at the center of the coloring region of each electrochromic device was measured using an optical spectrometer (USB4000 manufactured by Ocean Optics, Inc.). The average value of the transmittance at each wavelength in the visible region (from 380 to 780 nm) is shown in Tables 1 to 11 as the transmittance.

Here, the transmittance was measured at the time when the electrochromic device in a decolored state was applied with a voltage of −1.6 V for 5 seconds to cause color development. Therefore, a low transmittance indicates quick development of color upon application of voltage (because the transmittance decreases quickly as color development is quick).

In the electrochromic device according to an embodiment of the present invention, the transmittance is preferably 30% or less, more preferably 20% or less.

The composition of the electrochromic layer, the measured value of haze, and the average value of the transmittance in Examples 1 to 75 and Comparative Examples 1 and 2 are shown in Tables 1 to 11 below.

TABLE 1

| | Material | Composition | Weight Ratio | Haze | Transmittance |
|---|---|---|---|---|---|
| Example 1 | Electrochromic Material | Example Compound 2 | 3 | 0.6 | 25 |
| | | Example Compound 3 | 7 | | |
| | First Ion-conducting Material | BLEMMER 50POEP-800B | 9.9 | | |
| | Second Ion-conducting Material | — | — | | |
| | Polymerization Initiator | IRGACURE 184 | 0.1 | | |
| | Solvent | 2-Butanone | 80 | | |
| Example 2 | Electrochromic Material | Example Compound 2 | 3 | 0.6 | 24 |
| | | Example Compound 3 | 7 | | |
| | First Ion-conducting Material | BLEMMER PLE200 | 9.9 | | |
| | Second Ion-conducting Material | — | — | | |
| | Polymerization Initiator | IRGACURE 184 | 0.1 | | |
| | Solvent | 2-Butanone | 80 | | |
| Example 3 | Electrochromic Material | Example Compound 2 | 3 | 0.4 | 18 |
| | | Example Compound 3 | 7 | | |
| | First Ion-conducting Material | BLEMMER PLE1300 | 9.9 | | |
| | Second Ion-conducting Material | — | — | | |
| | Polymerization Initiator | IRGACURE 184 | 0.1 | | |
| | Solvent | 2-Butanone | 80 | | |
| Example 4 | Electrochromic Material | Example Compound 2 | 3 | 0.4 | 19 |
| | | Example Compound 3 | 7 | | |
| | First Ion-conducting Material | BLEMMER PSE1300 | 9.9 | | |
| | Second Ion-conducting Material | — | — | | |
| | Polymerization Initiator | IRGACURE 184 | 0.1 | | |
| | Solvent | 2-Butanone | 80 | | |
| Example 5 | Electrochromic Material | Example Compound 2 | 3 | 0.5 | 22 |
| | | Example Compound 3 | 7 | | |
| | First Ion-conducting Material | BLEMMER ALE-200 | 9.9 | | |
| | Second Ion-conducting Material | — | — | | |
| | Polymerization Initiator | IRGACURE 184 | 0.1 | | |
| | Solvent | 2-Butanone | 80 | | |
| Example 6 | Electrochromic Material | Example Compound 2 | 3 | 0.6 | 26 |
| | | Example Compound 3 | 7 | | |
| | First Ion-conducting Material | BLEMMER ANP-300 | 9.9 | | |
| | Second Ion-conducting Material | — | — | | |
| | Polymerization Initiator | IRGACURE 184 | 0.1 | | |
| | Solvent | 2-Butanone | 80 | | |
| Example 7 | Electrochromic Material | Example Compound 2 | 3 | 0.6 | 28 |
| | | Example Compound 3 | 7 | | |
| | First Ion-conducting Material | BLEMMER 75ANEP-600 | 9.9 | | |
| | Second Ion-conducting Material | — | — | | |
| | Polymerization Initiator | IRGACURE 184 | 0.1 | | |
| | Solvent | 2-Butanone | 80 | | |

TABLE 2

| | Material | Composition | Weight Ratio | Haze | Transmittance |
|---|---|---|---|---|---|
| Example 8 | Electrochromic Material | Example Compound 2 | 3 | 0.5 | 25 |
| | | Example Compound 3 | 7 | | |
| | First Ion-conducting Material | FANCRYL FA-314A | 9.9 | | |
| | Second Ion-conducting Material | — | — | | |
| | Polymerization Initiator | IRGACURE 184 | 0.1 | | |
| | Solvent | 2-Butanone | 80 | | |
| Example 9 | Electrochromic Material | Example Compound 2 | 3 | 0.4 | 18 |
| | | Example Compound 3 | 7 | | |

TABLE 2-continued

|  | Material | Composition | Weight Ratio | Haze | Transmittance |
|---|---|---|---|---|---|
|  | First Ion-conducting Material | FANCRYL FA-318AS | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 10 | Electrochromic Material | Example Compound 2 | 3 | 0.7 | 27 |
|  |  | Example Compound 3 | 7 |  |  |
|  | First Ion-conducting Material | A-LEN-10 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 11 | Electrochromic Material | Example Compound 2 | 3 | 0.6 | 20 |
|  |  | Example Compound 3 | 7 |  |  |
|  | First Ion-conducting Material | CD9075 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 12 | Electrochromic Material | Example Compound 2 | 3 | 0.5 | 21 |
|  |  | Example Compound 3 | 7 |  |  |
|  | First Ion-conducting Material | AKUARON KH-10 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 13 | Electrochromic Material | Example Compound 2 | 3 | 0.5 | 26 |
|  |  | Example Compound 3 | 7 |  |  |
|  | First Ion-conducting Material | AKUARON KH-05 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 14 | Electrochromic Material | Example Compound 2 | 3 | 0.5 | 20 |
|  |  | Example Compound 3 | 7 |  |  |
|  | First Ion-conducting Material | ADEKA REASOAP ER-10 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |

TABLE 3

|  | Material | Composition | Weight Ratio | Haze | Transmittance |
|---|---|---|---|---|---|
| Example 15 | Electrochromic Material | Example Compound 2 | 3 | 0.5 | 21 |
|  |  | Example Compound 3 | 7 |  |  |
|  | First Ion-conducting Material | ADEKA REASOAP ER-20 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 16 | Electrochromic Material | Example Compound 2 | 3 | 0.5 | 21 |
|  |  | Example Compound 3 | 7 |  |  |
|  | First Ion-conducting Material | ADEKA REASOAP NE-10 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 17 | Electrochromic Material | Example Compound 2 | 3 | 0.5 | 23 |
|  |  | Example Compound 3 | 7 |  |  |
|  | First Ion-conducting Material | ADEKA REASOAP NE-20 | 9.9 |  |  |
|  | Second Ion-conducting Material | — | — |  |  |

TABLE 3-continued

|  | Material | Composition | Weight Ratio | Haze | Transmittance |
|---|---|---|---|---|---|
|  | Polymerization Initiator | IRGACURE 184 | 0.1 |  |  |
|  | Solvent | 2-Butanone | 80 |  |  |
| Example 18 | Electrochromic Material | Example Compound 2 | 3 | 0.5 | 19 |
|  |  | Example Compound 3 | 7 |  |  |
|  | First Ion-conducting Material | AKUARON RN-20 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 19 | Electrochromic Material | Example Compound 2 | 3 | 0.5 | 24 |
|  |  | Example Compound 3 | 7 |  |  |
|  | First Ion-conducting Material | AKUARON RN-30 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 20 | Electrochromic Material | Example Compound 2 | 3 | 0.6 | 27 |
|  |  | Example Compound 3 | 7 |  |  |
|  | First Ion-conducting Material | BLEMMER PDBE-200A | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 21 | Electrochromic Material | Example Compound 2 | 3 | 0.6 | 28 |
|  |  | Example Compound 3 | 7 |  |  |
|  | First Ion-conducting Material | A-B1206PE | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |

TABLE 4

|  | Material | Composition | Weight Ratio | Haze | Transmittance |
|---|---|---|---|---|---|
| Example 22 | Electrochromic Material | Example Compound 2 | 3 | 0.6 | 30 |
|  |  | Example Compound 3 | 7 |  |  |
|  | First Ion-conducting Material | A-BPEF | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 23 | Electrochromic Material | Example Compound 2 | 3 | 0.6 | 28 |
|  |  | Example Compound 3 | 7 |  |  |
|  | First Ion-conducting Material | KAYARAD R-551 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 24 | Electrochromic Material | Example Compound 2 | 3 | 0.6 | 28 |
|  |  | Example Compound 3 | 7 |  |  |
|  | First Ion-conducting Material | KAYARAD R-712 | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 25 |  | Example Compound 2 | 3 | 0.6 | 26 |
|  |  | Example Compound 3 | 7 |  |  |
|  | Electrochromic Material | | | | |
|  | First Ion-conducting Material | SR349NS | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |
| Example 26 | Electrochromic Material | Example Compound 2 | 3 | 0.6 | 26 |
|  |  | Example Compound 3 | 7 |  |  |

TABLE 4-continued

|  | Material | Composition | Weight Ratio | Haze | Transmittance |
|---|---|---|---|---|---|
|  | First Ion-conducting Material | SR101 | 9.9 | | |
|  | Second Ion-conducting Material | — | — | | |
|  | Polymerization Initiator | IRGACURE 184 | 0.1 | | |
|  | Solvent | 2-Butanone | 80 | | |
| Example 27 | Electrochromic Material | Example Compound 2 | 3 | 0.6 | 27 |
|  |  | Example Compound 3 | 7 | | |
|  | First Ion-conducting Material | SR150 | 9.9 | | |
|  | Second Ion-conducting Material | — | — | | |
|  | Polymerization Initiator | IRGACURE 184 | 0.1 | | |
|  | Solvent | 2-Butanone | 80 | | |
| Example 28 | Electrochromic Material | Example Compound 2 | 3 | 0.6 | 25 |
|  |  | Example Compound 3 | 7 | | |
|  | First Ion-conducting Material | SR348NS | 9.9 | | |
|  | Second Ion-conducting Material | — | — | | |
|  | Polymerization Initiator | IRGACURE 184 | 0.1 | | |
|  | Solvent | 2-Butanone | 80 | | |

TABLE 5

|  | Material | Composition | Weight Ratio | Haze | Transmittance |
|---|---|---|---|---|---|
| Example 29 | Electrochromic Material | Example Compound 2 | 3 | 0.5 | 24 |
|  |  | Example Compound 3 | 7 | | |
|  | First Ion-conducting Material | BLEMMER PDBE-250 | 9.9 | | |
|  | Second Ion-conducting Material | — | — | | |
|  | Polymerization Initiator | IRGACURE 184 | 0.1 | | |
|  | Solvent | 2-Butanone | 80 | | |
| Example 30 | Electrochromic Material | Example Compound 2 | 3 | 0.4 | 24 |
|  |  | Example Compound 3 | 7 | | |
|  | First Ion-conducting Material | A-BPE-10 | 9.9 | | |
|  | Second Ion-conducting Material | — | — | | |
|  | Polymerization Initiator | IRGACURE 184 | 0.1 | | |
|  | Solvent | 2-Butanone | 80 | | |
| Example 31 | Electrochromic Material | Example Compound 2 | 3 | 0.4 | 20 |
|  |  | Example Compound 3 | 7 | | |
|  | First Ion-conducting Material | A-BPR-20 | 9.9 | | |
|  | Second Ion-conducting Material | — | — | | |
|  | Polymerization Initiator | IRGACURE 184 | 0.1 | | |
|  | Solvent | 2-Butanone | 80 | | |
| Example 32 | Electrochromic Material | Example Compound 2 | 3 | 0.4 | 15 |
|  |  | Example Compound 3 | 7 | | |
|  | First Ion-conducting Material | A-BPE-30 | 9.9 | | |
|  | Second Ion-conducting Material | — | — | | |
|  | Polymerization Initiator | IRGACURE 184 | 0.1 | | |
|  | Solvent | 2-Butanone | 80 | | |
| Example 33 | Electrochromic Material | Example Compound 2 | 3 | 0.5 | 23 |
|  |  | Example Compound 3 | 7 | | |
|  | First Ion-conducting Material | BPE-500 | 9.9 | | |
|  | Second Ion-conducting Material | — | — | | |
|  | Polymerization Initiator | IRGACURE 184 | 0.1 | | |
|  | Solvent | 2-Butanone | 80 | | |
| Example 34 | Electrochromic Material | Example Compound 2 | 3 | 0.4 | 19 |
|  |  | Example Compound 3 | 7 | | |
|  | First Ion-conducting Material | BPE-900 | 9.9 | | |
|  | Second Ion-conducting Material | — | — | | |

TABLE 5-continued

|  | Material | Composition | Weight Ratio | Haze | Transmittance |
|---|---|---|---|---|---|
|  | Polymerization Initiator | IRGACURE 184 | 0.1 |  |  |
|  | Solvent | 2-Butanone | 80 |  |  |
| Example 35 | Electrochromic Material | Example Compound 2 | 3 | 0.4 | 16 |
|  |  | Example Compound 3 | 7 |  |  |
|  | First Ion-conducting Material | BPE-1300N | 9.9 |  |  |
|  | Second Ion-conducting Material | — | — |  |  |
|  | Polymerization Initiator | IRGACURE 184 | 0.1 |  |  |
|  | Solvent | 2-Butanone | 80 |  |  |

TABLE 6

|  | Material | Composition | Weight Ratio | Haze | Transmittance |
|---|---|---|---|---|---|
| Example 36 | Electrochromic Material | Example Compound 2 | 3 | 0.7 | 20 |
|  |  | Example Compound 3 | 7 |  |  |
|  | First Ion-conducting Material | BLEMMER PLE200 | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 37 | Electrochromic Material | Example Compound 2 | 3 | 0.5 | 15 |
|  |  | Example Compound 3 | 7 |  |  |
|  | First Ion-conducting Material | BLEMMER PLE1300 | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 38 | Electrochromic Material | Example Compound 2 | 3 | 0.5 | 15 |
|  |  | Example Compound 3 | 7 |  |  |
|  | First Ion-conducting Material | BLEMMER PSE1300 | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 39 | Electrochromic Material | Example Compound 2 | 3 | 0.6 | 18 |
|  |  | Example Compound 3 | 7 |  |  |
|  | First Ion-conducting Material | BLEMMER ALE-200 | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 40 | Electrochromic Material | Example Compound 2 | 3 | 0.6 | 19 |
|  |  | Example Compound 3 | 7 |  |  |
|  | First Ion-conducting Material | FANCRYL FA-314A | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 41 | Electrochromic Material | Example Compound 2 | 3 | 0.5 | 12 |
|  |  | Example Compound 3 | 7 |  |  |
|  | First Ion-conducting Material | FANCRYL FA-318AS | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 42 | Electrochromic Material | Example Compound 2 | 3 | 0.6 | 20 |
|  |  | Example Compound 3 | 7 |  |  |
|  | First Ion-conducting Material | BLEMMER PDBE-250 | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |

TABLE 7

|  | Material | Composition | Weight Ratio | Haze | Transmittance |
|---|---|---|---|---|---|
| Example 43 | Electrochromic Material | Example Compound 2 | 3 | 0.5 | 19 |
|  |  | Example Compound 3 | 7 |  |  |
|  | First Ion-conducting Material | A-BPE-10 | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 44 | Electrochromic Material | Example Compound 2 | 3 | 0.5 | 16 |
|  |  | Example Compound 3 | 7 |  |  |
|  | First Ion-conducting Material | A-BPR-20 | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 45 | Electrochromic Material | Example Compound 2 | 3 | 0.4 | 12 |
|  |  | Example Compound 3 | 7 |  |  |
|  | First Ion-conducting Material | A-BPE-30 | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 46 | Electrochromic Material | Example Compound 2 | 3 | 0.5 | 15 |
|  |  | Example Compound 3 | 7 |  |  |
|  | First Ion-conducting Material | BPE-500 | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 47 | Electrochromic Material | Example Compound 2 | 3 | 0.5 | 14 |
|  |  | Example Compound 3 | 7 |  |  |
|  | First Ion-conducting Material | BPE-900 | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 48 | Electrochromic Material | Example Compound 2 | 3 | 0.5 | 10 |
|  |  | Example Compound 3 | 7 |  |  |
|  | First Ion-conducting Material | BPE-1300N | 1.98 |  |  |
|  | Second Ion-conducting Material | BLEMMER AME400 | 7.92 |  |  |
|  | Polymerization Initiator | IRGACURE 184 | 0.1 |  |  |
|  | Solvent | 2-Butanone | 80 |  |  |
| Example 49 | Electrochromic Material | Example Compound 2 | 3 | 0.5 | 19 |
|  |  | Example Compound 3 | 7 |  |  |
|  | First Ion-conducting Material | BLEMMER ALE-200 | 3.96 |  |  |
|  | Second Ion-conducting Material | BLEMMER AME400 | 5.94 |  |  |
|  | Polymerization Initiator | IRGACURE 184 | 0.1 |  |  |
|  | Solvent | 2-Butanone | 80 |  |  |

TABLE 8

|  | Material | Composition | Weight Ratio | Haze | Transmittance |
|---|---|---|---|---|---|
| Example 50 | Electrochromic Material | Example Compound 2 | 3 | 0.5 | 20 |
|  |  | Example Compound 3 | 7 |  |  |
|  | First Ion-conducting Material | BLEMMER ALE-200 | 5.94 |  |  |
|  | Second Ion-conducting Material | BLEMMER AME400 | 3.96 |  |  |
|  | Polymerization Initiator | IRGACURE 184 | 0.1 |  |  |
|  | Solvent | 2-Butanone | 80 |  |  |
| Example 51 | Electrochromic Material | Example Compound 2 | 3 | 0.5 | 21 |
|  |  | Example Compound 3 | 7 |  |  |

TABLE 8-continued

|  | Material | Composition | Weight Ratio | Haze | Transmittance |
|---|---|---|---|---|---|
|  | First Ion-conducting Material | BLEMMER ALE-200 | 7.92 |  |  |
|  | Second Ion-conducting Material | BLEMMER AME400 | 1.98 |  |  |
|  | Polymerization Initiator | IRGACURE 184 | 0.1 |  |  |
|  | Solvent | 2-Butanone | 80 |  |  |
| Example 52 | Electrochromic Material | Example Compound 2 | 3 | 0.4 | 14 |
|  |  | Example Compound 3 | 7 |  |  |
|  | First Ion-conducting Material | FANCRYL FA-318AS | 3.96 |  |  |
|  | Second Ion-conducting Material | BLEMMER AME400 | 5.94 |  |  |
|  | Polymerization Initiator | IRGACURE 184 | 0.1 |  |  |
|  | Solvent | 2-Butanone | 80 |  |  |
| Example 53 | Electrochromic Material | Example Compound 2 | 3 | 0.4 | 15 |
|  |  | Example Compound 3 | 7 |  |  |
|  | First Ion-conducting Material | FANCRYL FA-318AS | 5.94 |  |  |
|  | Second Ion-conducting Material | BLEMMER AME400 | 3.96 |  |  |
|  | Polymerization Initiator | IRGACURE 184 | 0.1 |  |  |
|  | Solvent | 2-Butanone | 80 |  |  |
| Example 54 | Electrochromic Material | Example Compound 2 | 3 | 0.4 | 17 |
|  |  | Example Compound 3 | 7 |  |  |
|  | First Ion-conducting Material | FANCRYL FA-318AS | 7.92 |  |  |
|  | Second Ion-conducting Material | BLEMMER AME400 | 1.98 |  |  |
|  | Polymerization Initiator | IRGACURE 184 | 0.1 |  |  |
|  | Solvent | 2-Butanone | 80 |  |  |
| Example 55 | Electrochromic Material | Example Compound 2 | 3 | 0.5 | 20 |
|  |  | Example Compound 3 | 7 |  |  |
|  | First Ion-conducting Material | A-BPE-10 | 3.96 |  |  |
|  | Second Ion-conducting Material | BLEMMER AME400 | 5.94 |  |  |
|  | Polymerization Initiator | IRGACURE 184 | 0.1 |  |  |
|  | Solvent | 2-Butanone | 80 |  |  |
| Example 56 | Electrochromic Material | Example Compound 2 | 3 | 0.5 | 22 |
|  |  | Example Compound 3 | 7 |  |  |
|  | First Ion-conducting Material | A-BPE-10 | 5.94 |  |  |
|  | Second Ion-conducting Material | BLEMMER AME400 | 3.96 |  |  |
|  | Polymerization Initiator | IRGACURE 184 | 0.1 |  |  |
|  | Solvent | 2-Butanone | 80 |  |  |

TABLE 9

|  | Material | Composition | Weight Ratio | Haze | Transmittance |
|---|---|---|---|---|---|
| Example 57 | Electrochromic Material | Example Compound 2 | 3 | 0.5 | 23 |
|  |  | Example Compound 3 | 7 |  |  |
|  | First Ion-conducting Material | A-BPE-10 | 7.92 |  |  |
|  | Second Ion-conducting Material | BLEMMER AME400 | 1.98 |  |  |
|  | Polymerization Initiator | IRGACURE 184 | 0.1 |  |  |
|  | Solvent | 2-Butanone | 80 |  |  |
| Example 58 | Electrochromic Material | Example Compound 2 | 3 | 0.4 | 17 |
|  |  | Example Compound 3 | 7 |  |  |
|  | First Ion-conducting Material | A-BPR-20 | 3.96 |  |  |
|  | Second Ion-conducting Material | BLEMMER AME400 | 5.94 |  |  |
|  | Polymerization Initiator | IRGACURE 184 | 0.1 |  |  |
|  | Solvent | 2-Butanone | 80 |  |  |
| Example 59 | Electrochromic Material | Example Compound 2 | 3 | 0.4 | 18 |
|  |  | Example Compound 3 | 7 |  |  |
|  | First Ion-conducting Material | A-BPR-20 | 5.94 |  |  |
|  | Second Ion-conducting Material | BLEMMER AME400 | 3.96 |  |  |

TABLE 9-continued

|  | Material | Composition | Weight Ratio | Haze | Transmittance |
|---|---|---|---|---|---|
|  | Polymerization Initiator | IRGACURE 184 | 0.1 | | |
|  | Solvent | 2-Butanone | 80 | | |
| Example 60 | Electrochromic Material | Example Compound 2 | 3 | 0.4 | 18 |
|  |  | Example Compound 3 | 7 | | |
|  | First Ion-conducting Material | A-BPR-20 | 7.92 | | |
|  | Second Ion-conducting Material | BLEMMER AME400 | 1.98 | | |
|  | Polymerization Initiator | IRGACURE 184 | 0.1 | | |
|  | Solvent | 2-Butanone | 80 | | |
| Example 61 | Electrochromic Material | Example Compound 2 | 3 | 0.4 | 13 |
|  |  | Example Compound 3 | 7 | | |
|  | First Ion-conducting Material | A-BPE-30 | 3.96 | | |
|  | Second Ion-conducting Material | BLEMMER AME400 | 5.94 | | |
|  | Polymerization Initiator | IRGACURE 184 | 0.1 | | |
|  | Solvent | 2-Butanone | 80 | | |
| Example 62 | Electrochromic Material | Example Compound 2 | 3 | 0.4 | 14 |
|  |  | Example Compound 3 | 7 | | |
|  | First Ion-conducting Material | A-BPE-30 | 5.94 | | |
|  | Second Ion-conducting Material | BLEMMER AME400 | 3.96 | | |
|  | Polymerization Initiator | IRGACURE 184 | 0.1 | | |
|  | Solvent | 2-Butanone | 80 | | |
| Example 63 | Electrochromic Material | Example Compound 2 | 3 | 0.4 | 13 |
|  |  | Example Compound 3 | 7 | | |
|  | First Ion-conducting Material | A-BPE-30 | 7.92 | | |
|  | Second Ion-conducting Material | BLEMMER AME400 | 1.98 | | |
|  | Polymerization Initiator | IRGACURE 184 | 0.1 | | |
|  | Solvent | 2-Butanone | 80 | | |

TABLE 10

|  | Material | Composition | Weight Ratio | Haze | Transmittance |
|---|---|---|---|---|---|
| Example 64 | Electrochromic Material | Example Compound 2 | 3.6 | 0.5 | 15 |
|  |  | Example Compound 3 | 8.4 | | |
|  | First Ion-conducting Material | FANCRYL FA-318AS | 1.584 | | |
|  | Second Ion-conducting Material | BLEMMER AME400 | 6.336 | | |
|  | Polymerization Initiator | IRGACURE 184 | 0.08 | | |
|  | Solvent | 2-Butanone | 80 | | |
| Example 65 | Electrochromic Material | Example Compound 2 | 2.4 | 0.4 | 14 |
|  |  | Example Compound 3 | 5.6 | | |
|  | First Ion-conducting Material | FANCRYL FA-318AS | 2.376 | | |
|  | Second Ion-conducting Material | BLEMMER AME400 | 9.504 | | |
|  | Polymerization Initiator | IRGACURE 184 | 0.08 | | |
|  | Solvent | 2-Butanone | 80 | | |
| Example 66 | Electrochromic Material | Example Compound 1 | 7 | 0.4 | 16 |
|  |  | Example Compound 3 | 3 | | |
|  | First Ion-conducting Material | FANCRYL FA-318AS | 7.92 | | |
|  | Second Ion-conducting Material | BLEMMER AME400 | 1.98 | | |
|  | Polymerization Initiator | IRGACURE 184 | 0.1 | | |
|  | Solvent | 2-Butanone | 80 | | |
| Example 67 | Electrochromic Material | Example Compound 1 | 7 | 0.4 | 17 |
|  |  | Example Compound 3 | 3 | | |
|  | First Ion-conducting Material | FANCRYL FA-318AS | 7.92 | | |
|  | Second Ion-conducting Material | BLEMMER ADE400 | 1.98 | | |
|  | Polymerization Initiator | IRGACURE 184 | 0.1 | | |
|  | Solvent | 2-Butanone | 80 | | |

TABLE 10-continued

| | Material | Composition | Weight Ratio | Haze | Transmittance |
|---|---|---|---|---|---|
| Example 68 | Electrochromic Material | Example Compound 2 | 3.6 | 0.5 | 18 |
| | | Example Compound 3 | 8.4 | | |
| | First Ion-conducting Material | A-BPR-20 | 1.584 | | |
| | Second Ion-conducting Material | BLEMMER AME400 | 6.336 | | |
| | Polymerization Initiator | IRGACURE 184 | 0.08 | | |
| | Solvent | 2-Butanone | 80 | | |
| Example 69 | Electrochromic Material | Example Compound 2 | 2.4 | 0.4 | 18 |
| | | Example Compound 3 | 5.6 | | |
| | First Ion-conducting Material | A-BPR-20 | 2.376 | | |
| | Second Ion-conducting Material | BLEMMER AME400 | 9.504 | | |
| | Polymerization Initiator | IRGACURE 184 | 0.08 | | |
| | Solvent | 2-Butanone | 80 | | |
| Example 70 | Electrochromic Material | Example Compound 1 | 7 | 0.4 | 19 |
| | | Example Compound 3 | 3 | | |
| | First Ion-conducting Material | A-BPR-20 | 7.92 | | |
| | Second Ion-conducting Material | BLEMMER AME400 | 1.98 | | |
| | Polymerization Initiator | IRGACURE 184 | 0.1 | | |
| | Solvent | 2-Butanone | 80 | | |

TABLE 11

| | Material | Composition | Weight Ratio | Haze | Transmittance |
|---|---|---|---|---|---|
| Example 71 | Electrochromic Material | Example Compound 1 | 7 | 0.4 | 21 |
| | | Example Compound 3 | 3 | | |
| | First Ion-conducting Material | A-BPR-20 | 7.92 | | |
| | Second Ion-conducting Material | BLEMMER ADE400 | 1.98 | | |
| | Polymerization Initiator | IRGACURE 184 | 0.1 | | |
| | Solvent | 2-Butanone | 80 | | |
| Example 72 | Electrochromic Material | Example Compound 2 | 3.6 | 0.4 | 15 |
| | | Example Compound 3 | 8.4 | | |
| | First Ion-conducting Material | A-BPE-30 | 1.584 | | |
| | Second Ion-conducting Material | BLEMMER AME400 | 6.336 | | |
| | Polymerization Initiator | IRGACURE 184 | 0.08 | | |
| | Solvent | 2-Butanone | 80 | | |
| Example 73 | Electrochromic Material | Example Compound 2 | 2.4 | 0.4 | 14 |
| | | Example Compound 3 | 5.6 | | |
| | First Ion-conducting Material | A-BPE-30 | 2.376 | | |
| | Second Ion-conducting Material | BLEMMER AME400 | 9.504 | | |
| | Polymerization Initiator | IRGACURE 184 | 0.08 | | |
| | Solvent | 2-Butanone | 80 | | |
| Example 74 | Electrochromic Material | Example Compound 1 | 7 | 0.4 | 15 |
| | | Example Compound 3 | 3 | | |
| | First Ion-conducting Material | A-BPE-30 | 7.92 | | |
| | Second Ion-conducting Material | BLEMMER AME400 | 1.98 | | |
| | Polymerization Initiator | IRGACURE 184 | 0.1 | | |
| | Solvent | 2-Butanone | 80 | | |
| Example 75 | Electrochromic Material | Example Compound 1 | 7 | 0.3 | 16 |
| | | Example Compound 3 | 3 | | |
| | First Ion-conducting Material | A-BPE-30 | 7.92 | | |
| | Second Ion-conducting Material | BLEMMER ADE400 | 1.98 | | |
| | Polymerization Initiator | IRGACURE 184 | 0.1 | | |
| | Solvent | 2-Butanone | 80 | | |
| Comparative Example 1 | Electrochromic Material | Example Compound 2 | 3 | 7.5 | 64 |
| | | Example Compound 3 | 7 | | |
| | First Ion-conducting Material | — | — | | |

TABLE 11-continued

| | Material | Composition | Weight Ratio | Haze | Transmittance |
|---|---|---|---|---|---|
| | Second Ion-conducting Material | BLEMMER AME400 | 9.9 | | |
| | Polymerization Initiator | IRGACURE 184 | 0.1 | | |
| | Solvent | 2-Butanone | 80 | | |
| Comparative Example 2 | Electrochromic Material | Example Compound 1 | 7 | 7.1 | 58 |
| | | Example Compound 3 | 3 | | |
| | First Ion-conducting Material | — | — | | |
| | Second Ion-conducting Material | BLEMMER ADE400 | 9.9 | | |
| | Polymerization Initiator | IRGACURE 184 | 0.1 | | |
| | Solvent | 2-Butanone | 80 | | |

Among the compounds used as the first ion-conducting material or the second ion-conducting material in Examples 1 to 75 and Comparative Examples 1 to 2, those the structure of which is disclosed by the manufacturer are shown below with solubility parameter of the non-ion-conducting portion.

Example Compound 4

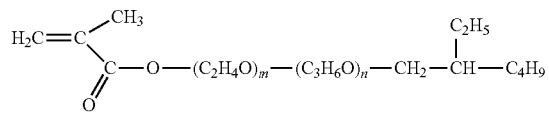

(BLEMMER 50POEP-800B)
Solubility parameter: 7.83 $(cal/cm^3)^{0.5}$
$m \approx 8 \; n \approx 6$ Example Compound 5

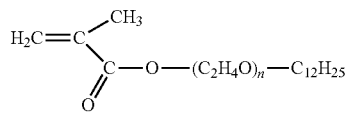

(BLEMMER PLE200)
Solubility parameter: 8.19 $(cal/cm^3)^{0.5}$
$n \approx 4$

Example Compound 6

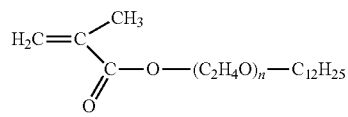

(BLEMMER PLE1300)
Solubility parameter: 8.19 $(cal/cm^3)^{0.5}$
$n \approx 30$

Example Compound 7

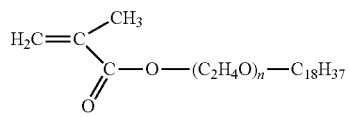

(BLEMMER PSE1300)
Solubility parameter: 8.31 $(cal/cm^3)^{0.5}$
$n \approx 30$

Example Compound 8

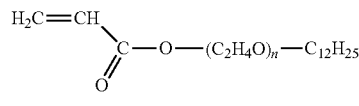

(BLEMMER ALE-200)
Solubility parameter: 8.19 $(cal/cm^3)^{0.5}$
$n \approx 4$

Example Compound 9

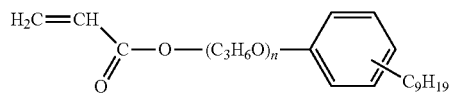

(BLEMMER ANP-300)
Solubility parameter: 9.21 $(cal/cm^3)^{0.5}$
$n \approx 5$

Example Compound 10

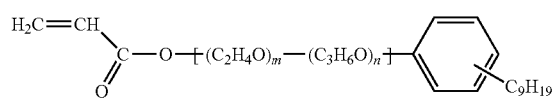

(BLEMMER 75ANEP-600)
Solubility parameter: 9.21 $(cal/cm^3)^{0.5}$
* [ ]: Random Addition Example Compound 11

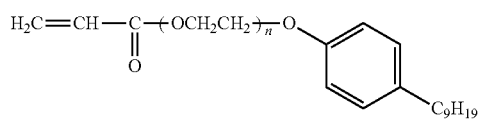

(FANCRYL FA-314A)
Solubility parameter: 9.21 $(cal/cm^3)^{0.5}$
$n \approx 4$

-continued

Example Compound 12

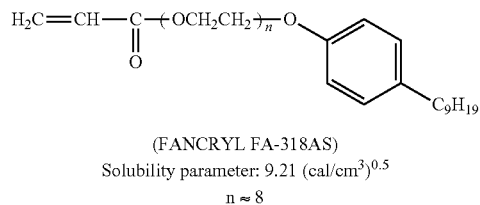

(FANCRYL FA-318AS)
Solubility parameter: 9.21 $(cal/cm^3)^{0.5}$
n ≈ 8

Example Compound 13

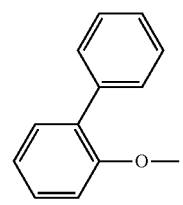

(A-LEN-10)
Solubility parameter: 11.11 $(cal/cm^3)^{0.5}$

Example Compound 14

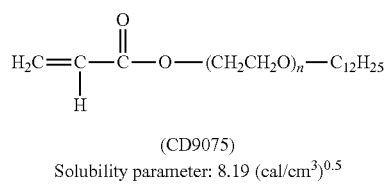

(CD9075)
Solubility parameter: 8.19 $(cal/cm^3)^{0.5}$

Example Compound 23

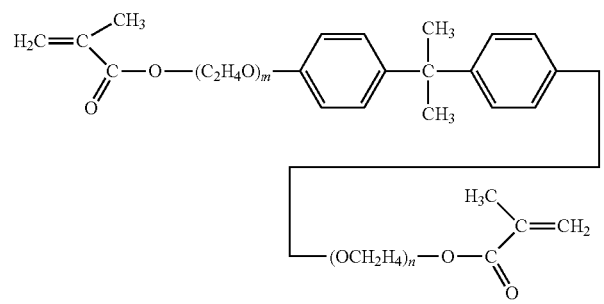

(BLEMMER PBDE-200A)
Solubility parameter: 10.82 $(cal/cm^3)^{0.5}$
m + n ≈ 4

Example Compound 24

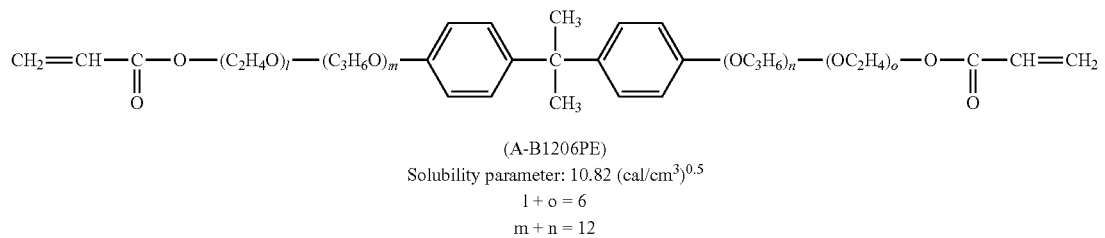

(A-B1206PE)
Solubility parameter: 10.82 $(cal/cm^3)^{0.5}$
l + o = 6
m + n = 12

Example Compound 25

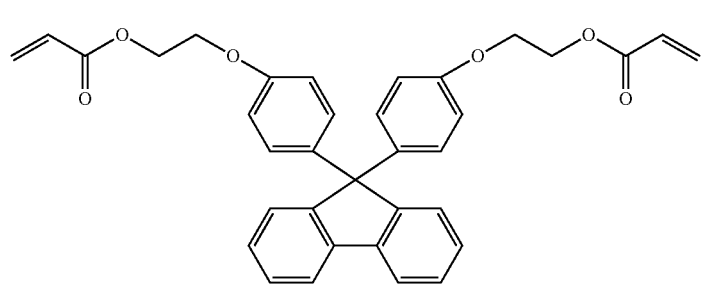

(A-BPEF)
Solubility parameter: 12.74 $(cal/cm^3)^{0.5}$

Example Compound 26

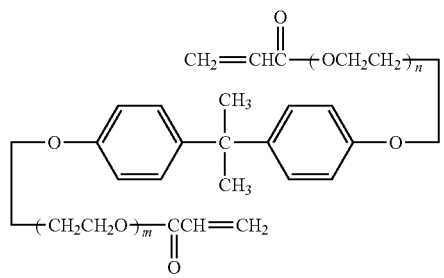

(K.AYARAD R-551)
Solubility parameter: 10.82 $(cal/cm^3)^{0.5}$
m + n = 4

Example Compound 27

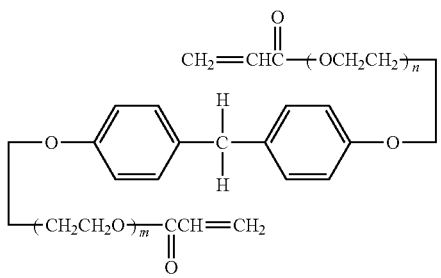

(K.AYARAD R-712)
Solubility parameter: 11.66 $(cal/cm^3)^{0.5}$
m + n = 4

Example Compound 28

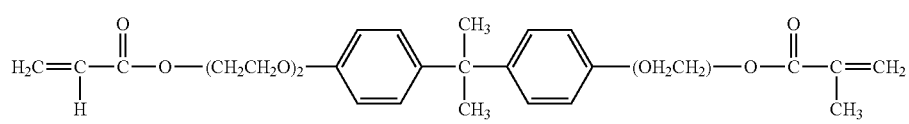

(SR349NS)
Solubility parameter: 10.82 $(cal/cm^3)^{0.5}$

Example Compound 29

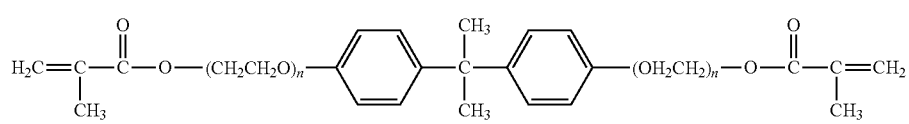

(SR101)
Solubility parameter: 10.82 $(cal/cm^3)^{0.5}$

Example Compound 30

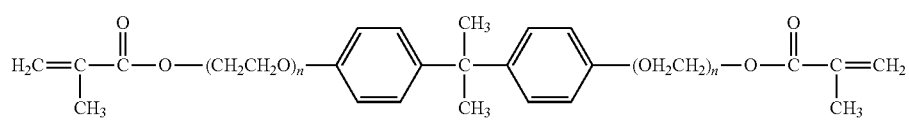

(SR150)
Solubility parameter: 10.82 $(cal/cm^3)^{0.5}$

Example Compound 31

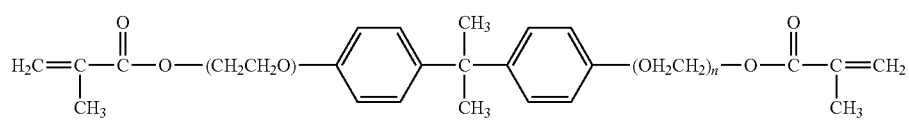

(SR348NS)
Solubility parameter: 10.82 $(cal/cm^3)^{0.5}$

Example Compound 32

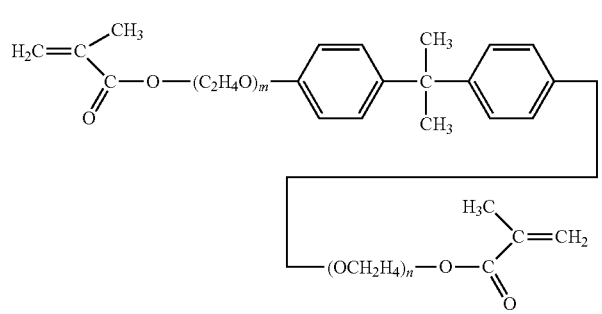

(BLEMMER PDBE-250)
Solubility parameter: 10.82 $(cal/cm^3)^{0.5}$
m + n ≈ 6

-continued

Example Compound 33

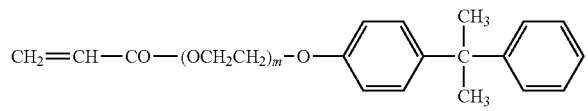

(A-BPE-10)
Solubility parameter: 10.82 $(cal/cm^3)^{0.5}$
m + n = 10

Example Compound 34

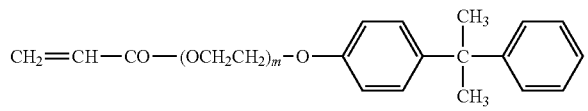

(A-BPR-20)
Solubility parameter: 10.82 $(cal/cm^3)^{0.5}$
m + n = 17

Example Compound 35

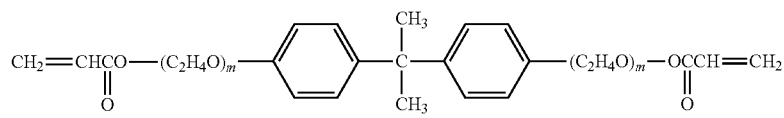

(A-BPE-30)
Solubility parameter: 10.82 $(cal/cm^3)^{0.5}$
m + n = 30

Example Compound 36

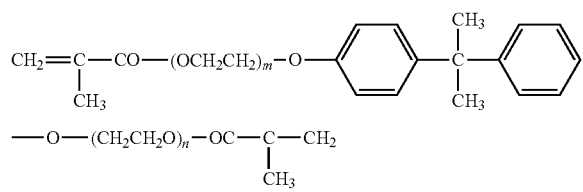

(BPE-500)
Solubility parameter: 10.82 $(cal/cm^3)^{0.5}$
m + n = 10

Example Compound 37

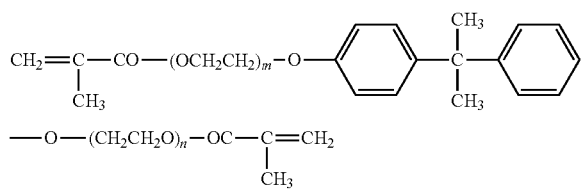

(BPE-900)
Solubility parameter: 10.82 $(cal/cm^3)^{0.5}$
m + n = 17

Example Compound 38

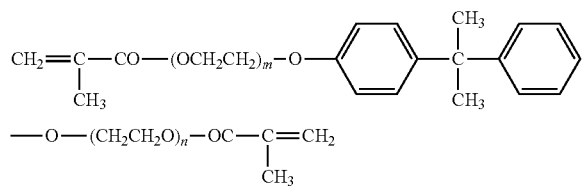

(BPE-1300N)
Solubility parameter: 10.82 $(cal/cm^3)^{0.5}$
m + n = 30

Example Compound 39

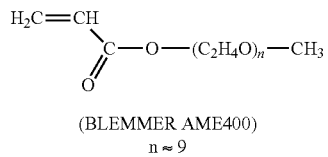

(BLEMMER AME400)
n ≈ 9

Example Compound 40

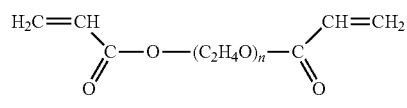

(BLEMMER ADE400)
n ≈ 9

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An electrochromic device comprising:
a first electrode;
a second electrode opposed to the first electrode at an interval; and
an electrochromic layer between the first electrode and the second electrode, the electrochromic layer containing:
an electrochromic material; and
a first ion-conducting material partially comprising a non-ion-conducting portion that does not conduct ions, the non-ion-conducting portion comprising a molecular unit structure having an atomic arrangement in which 8 or more atoms having a valence of 2 or more are bonded with each other, the atoms comprising heteroatoms in a number of 15% or less based on a total number of the atoms,
wherein the electrochromic material and the first ion-conducting material are mixed in the electrochromic layer, and
a proportion of the first ion-conducting material in the electrochromic layer is in a range of 5% to 50% by mass.

2. The electrochromic device according to claim 1, wherein the non-ion-conducting portion has a solubility parameter of from 7.5 to 13.

3. The electrochromic device according to claim 1, wherein the non-ion-conducting portion comprises at least one member selected from the group consisting of an alkyl group, an alkenyl group, an acyl group, an alkenyl group, an alkyl phenyl group, a bis(alkyl phenyl) group, and a polycyclic phenyl group.

4. The electrochromic device according to claim 1, wherein the first ion-conducting material comprises an alkylene oxide structure.

5. The electrochromic device according to claim 4, wherein the alkylene oxide structure is an ethylene oxide structure.

6. The electrochromic device according to claim 1, wherein the first ion-conducting material has a structure represented by one of the following general formulae (I), (I-1), and (I-2):

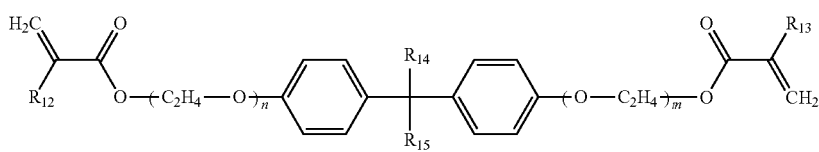

General Formula (1)

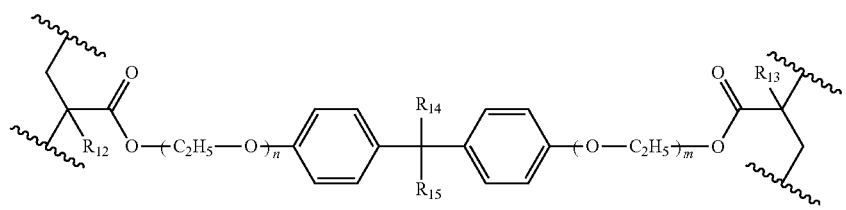

General Formula (1-1)

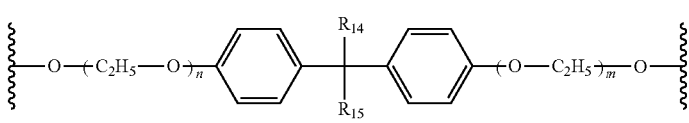

General Formula (1-2)

where each of $R_{14}$ and $R_{15}$ independently represents hydrogen atom, an alkyl group having one or more carbon atoms, or phenyl group; each of $R_{12}$ and $R_{13}$ independently represents hydrogen atom or methyl group; and each of n and m independently represents an integer of 1 or more.

7. The electrochromic device according to claim 1, wherein the electrochromic material and the first ion-conducting material form a copolymer in the electrochromic layer.

8. The electrochromic device according to claim 1, wherein the electrochromic layer further contains a second ion-conducting material.

9. The electrochromic device according to claim 8, the electrochromic material, the first ion-conducting material, and the second ion-conducting material form a copolymer in the electrochromic layer.

10. The electrochromic device according to claim 1, wherein at least one of the electrochromic material and the first ion-conducting material has acrylic group or methacrylic group.

11. The electrochromic device according to claim 1, wherein the electrochromic material comprises at least one of a benzidine derivative and a triphenylamine derivative.

* * * * *